United States Patent
Fan

(10) Patent No.: US 12,125,638 B2
(45) Date of Patent: Oct. 22, 2024

(54) HIGH FREQUENCY SUPERCAPACITORS AND METHODS OF MAKING SAME

(71) Applicant: Texas Tech University System, Lubbock, TX (US)

(72) Inventor: Zhaoyang Fan, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 822 days.

(21) Appl. No.: 17/088,044

(22) Filed: Nov. 3, 2020

(65) Prior Publication Data

US 2021/0134536 A1 May 6, 2021

Related U.S. Application Data

(63) Continuation of application No. 16/608,526, filed as application No. PCT/US2018/029812 on Apr. 27, 2018, now Pat. No. 10,923,293.

(60) Provisional application No. 62/491,097, filed on Apr. 27, 2017.

(51) Int. Cl.
| | |
|---|---|
| *H01G 11/36* | (2013.01) |
| *H01G 11/24* | (2013.01) |
| *H01G 11/28* | (2013.01) |
| *H01G 11/44* | (2013.01) |
| *H01G 11/48* | (2013.01) |

(Continued)

(52) U.S. Cl.
CPC ............ *H01G 11/36* (2013.01); *H01G 11/24* (2013.01); *H01G 11/28* (2013.01); *H01G 11/44* (2013.01); *H01G 11/48* (2013.01); *H01G 11/52* (2013.01); *H01G 11/86* (2013.01)

(58) Field of Classification Search
CPC ........ H01G 11/86; H01G 11/48; H01G 11/44; H01G 11/52; H01G 11/24; H01G 11/36
See application file for complete search history.

(56) References Cited

U.S. PATENT DOCUMENTS

| | | | | |
|---|---|---|---|---|
| 2006/0223947 A1* | 10/2006 | Olesik | ..................... | C08F 38/00 |
| | | | | 525/328.1 |
| 2009/0092747 A1 | 4/2009 | Zhamu et al. | | |

(Continued)

FOREIGN PATENT DOCUMENTS

| | | | |
|---|---|---|---|
| KR | 101766143 B1 * | 8/2017 | |
| WO | 2015138038 A2 | 9/2015 | |

OTHER PUBLICATIONS

Gupta et al., Biochar Activated by Oxygen Plasma for Supercapacitors, Journal of Power Sources, 274 (2015), pp. 1300-1305.

(Continued)

*Primary Examiner* — David M Sinclair
(74) *Attorney, Agent, or Firm* — Dickinson Wright PLLC; Ross Spencer Garsson

(57) ABSTRACT

High-frequency supercapacitors that can respond at kilohertz frequencies (AC-supercapacitors). The electrodes of the AC-supercapacitors include edge oriented graphene (EOG) electrodes or carbon nanofiber network (CNN) electrodes. The EOG electrodes are formed by utilizing a plasma and feedstock carbon gas to carbonize cellulous paper and deposit graphene implemented in one step. The CNN electrodes are formed by pyrolyzing a carbon nanofiber network utilizing a plasma.

15 Claims, 23 Drawing Sheets

(51) Int. Cl.
    *H01G 11/52*          (2013.01)
    *H01G 11/86*          (2013.01)

(56) References Cited

U.S. PATENT DOCUMENTS

| | | | |
|---|---|---|---|
| 2010/0033902 A1* | 2/2010 | Cadek | H01G 11/36 |
| | | | 977/750 |
| 2013/0316236 A1* | 11/2013 | Hackenberg | H01M 4/386 |
| | | | 429/223 |
| 2016/0322174 A1 | 11/2016 | Fan et al. | |
| 2017/0110259 A1 | 4/2017 | Mitlin et al. | |

OTHER PUBLICATIONS

International Bureau, International Preliminary Report on Patentability and Written Opinion for PCT/US2018/029812 mailed on Nov. 7, 2019, 9 pages.

International Searching Authority, International Search Report and Written Opinion for PCT/US2018/029812 mailed on Sep. 4, 2018, 16 pages.

Ren et al., Ultrahigh-rate supercapacitors with large capacitance based on edgeoriented graphene coated carbonized cellulous paper as flexible freestanding electrodes, Elsevier, Journal of Power Sources, 325 (2016), pp. 152-160.

Islam et al., Kilohertz AC-Supercapacitors for Ripple Current Filtering, Gleamm, Department of Electrical and Computer Engineering and Nano Tech Center, Texas Tech University, 1 page.

Ren et al., Ultrahigh-rate supercapacitors with large capacitance based on edge oriented graphene coated carbonized cellulous paper as flexible freestanding electrodes, Supplementary Information, 6 pages.

\* cited by examiner

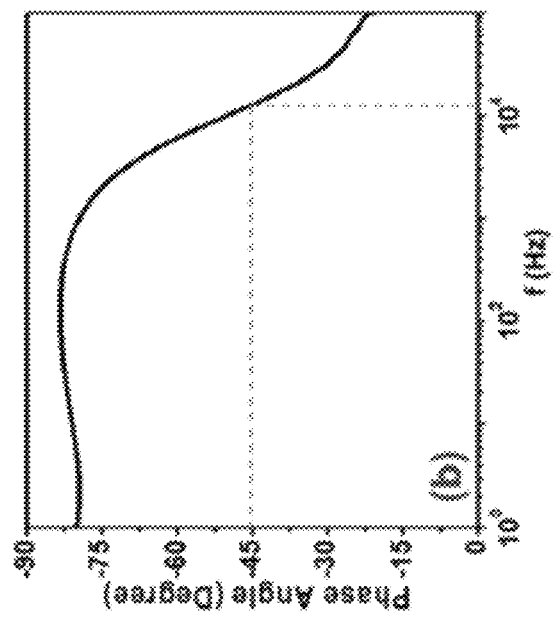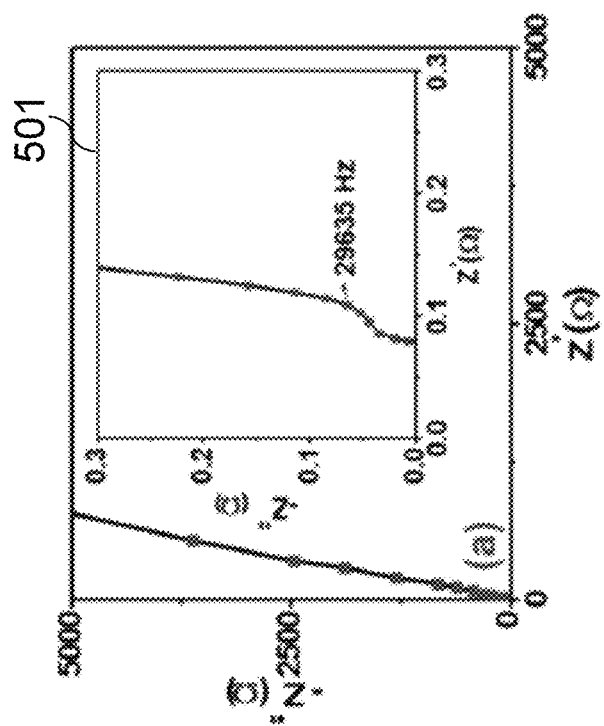
FIG. 5A
FIG. 5B

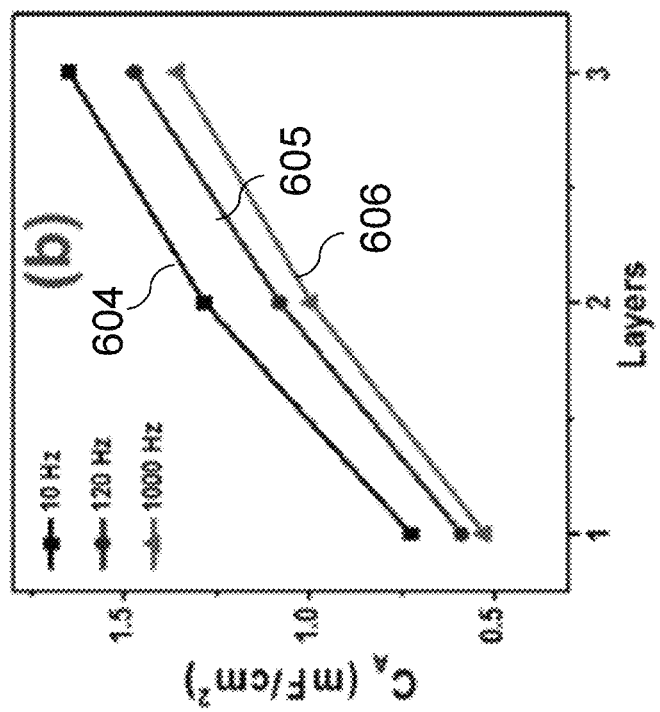
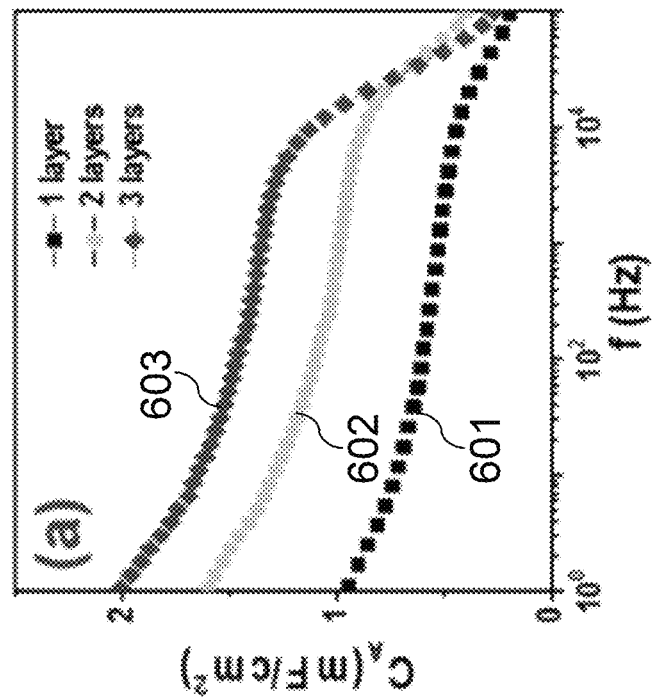
*FIG. 6A*    *FIG. 6B*

HIGH FREQUENCY SUPERCAPACITORS AND METHODS OF MAKING SAME

RELATED PATENTS/PATENT APPLICATIONS

This application is a continuation application of U.S. patent application Ser. No. 16/608,526, filed Oct. 25, 2019, and entitled "High Frequency Supercapacitors And Methods Of Making Same," which is the 35 U.S.C § 371 national application of International PCT Application Publ. No. WO/2018/200966, filed Apr. 27, 2018, published Nov. 1, 2018, and entitled "High Frequency Supercapacitors And Methods Of Making Same", which designated the United States, and which claims priority to U.S. Patent Application No. 62/491,097, entitled "Ultrahigh-Rate Supercapacitors With Large Capacitance Based On Edge Oriented Graphene Coated Carbonized Cellulous Paper As Flexible Freestanding Electrodes," filed on Apr. 27, 2017, which applications are commonly assigned to the Applicant of the present invention and are hereby incorporated herein by reference in their entirety for all purposes.

GOVERNMENT INTEREST

The invention was made with governmental support under Grant No. 1611060 awarded by the National Science Foundation. The government has certain rights in the invention.

TECHNICAL FIELD

The present invention relates in general to ultrahigh-rate (or high-frequency, HF) supercapacitors, including HF-supercapacitors with large capacitance based on edge-oriented graphene coated carbonized cellulous paper or carbonized cellulose nanofiber aerogel (or network) or carbonized polymer nanofiber network as electrodes.

BACKGROUND OF THE INVENTION

With billions of pieces sold every year, aluminum electrolytic capacitors (AECs) are a ubiquitous component used in any power related circuit design for current ripple filtering in power conversion and power conditioning for electronic devices and power systems. They may also be used as fast energy storage for environmental pulse energy harvesting or as pulse power generators for strobe applications. Billions of pieces of AECs are sold per year and are utilized in consumer, medical devices, defense devices, the telecommunications industry, and the renewable energy markets. Even though AECs are so widely used, they still come with their share of problems. Their bulky size, polarity sensitivity, large equivalent series resistance (ESR) and hence high loss and high thermal generation, low temperature rating, and poor lifetime, are some of the pain points customers face.

Supercapacitors, also called as electrochemical capacitors (ECs), electric double layer capacitors (EDLCs), or ultracapacitors, have a capacitance density larger than AECs by several orders of magnitude and therefore can store much more energy than AECs. They are being widely investigated to further increase their energy density to be close to that of batteries, so that they function as independent energy source or in supplement with the low power batteries. As energy sources, conventional electric double layer based supercapacitors have a charge and discharge rate (frequency) limited up to approximately 1 s (1 Hz). In other words, they work under direct current (DC). They will behave more like a resistor but not a capacitor at higher frequencies. Therefore, although these conventional supercapacitors can have a much smaller volume size than AECs due to their much large capacitance density, they cannot play the roles of AECs that work at much higher frequencies for ripple current filtering, decoupling, high-frequency pulse energy storage, short pulse generation, and other functions.

A huge performance gap exists between conventional supercapacitors and AECs. Supercapacitors provide much larger capacitance density than AECs, but the latter can respond at tens of kilohertz (kHz) frequencies. Since ABCs are commonly used in power modules and circuits for ripple current filtering and other functions, while their large size is becoming a limiting factor in downscaling the electronic appliances size or profile, there are great needs and interests in developing high-frequency (HF) supercapacitors with a much reduced size to replace ABCS for filtering and other applications. For 60 Hz line-frequency, considering the harmonic frequencies after rectification, such HF-supercapacitors should respond at hundreds to kilo hertz range. In another frontier, environmental energy harvesting through piezoelectric- or triboelectric-generator is promising for self-powered autonomous sensors and internet of things (IOT) technology, while the environmental mechanical energy sources and hence the outputs from the micro-generators are typically pulsed currents with tens or hundreds Hz. They also require kHz HF-supercapacitors to efficiently store the harvested energy. In addition, HF-supercapacitors with their large capacitance density and hence small volume, will also be useful for short pulse (down to millisecond or sub-millisecond range) generation used in portable/wearable devices, implantable devices, or others.

Using miniature HF-supercapacitors to replace AECs will not only solve the bulky size problem of AECs, but may also overcome other issues related with AECs. AECs have the intrinsic positive/negative polarity problem, while HF-supercapacitors are non-polar device. AECs have large equivalent series resistance (ESR) and hence high power loss and high thermal generation, low temperature rating, and poor lifetime, while HF-supercapacitors, if properly design, can have low ESR, low power loss, long lifetime. They also could have high temperature rating. With all these potential merits of HF-supercapacitors, now the question is how to design HF-supercapacitors to be able to run at hundreds hertz (Hz) and even kilohertz (kHz) frequency range, considering that the conventional supercapacitors only runs at DC or below a few hertz frequency.

To evaluate the response frequency of a capacitor, including a supercapacitor, the characteristic frequency $f_0$ when its impedance phase angle reaches $-45°$ is commonly used, which defines the boundary between capacitance dominance and resistance dominance. Of the two categories of supercapacitors, pseudocapacitors are intrinsically slow even though fast pseudocapacitors were reported, while EDLCs in principle are capable of charging and discharging within milliseconds, promising for kilohertz (kHz) HF-supercapacitors. The frequency response of these EDLC based supercapacitor strongly depends on the nanostructure of electrodes, conductivity of the electrode material and the choice of electrolyte. In terms of the electrode nanostructure, reduction of porosity and electrode thickness to accelerate electrolyte ions transport is the key for high-frequency response. However, this diminishes the achievable capacitance.

Towards high-frequency response by partially sacrificing capacitance, vertically-oriented graphene (VOG) and carbon nanotube (CNT) ultra-thin film have been widely studied.

Since very thin (~1 μm to 0.1 μm) "active" materials were used on a thick metal substrate, they provided a very limited electrode areal capacitance density and volumetric density when the current collector also included. For conventional sandwich-type cell configuration, practical consideration requires a fairly thick active material layer to minimize the mass and volume penalties associated with the inactive components that include separators, electrolytes, current collectors, and packaging. This is particularly true when multiple cells have to be serially packed together for a high voltage rating. Further improving the areal capacitance to a new level is in demand to develop compact HF-supercapacitors.

As a summary, AECs are a ubiquitous component used in any power related circuit design for current ripple filtering in power conversion and power conditioning for electronic devices, as well as for industrial power supplies, solar and wind based renewable energy generation and many others. They may also be used as fast energy storage for environmental pulse energy harvesting or as pulse power generators for strobe applications. Bulky size, poor lifetime, large equivalent series resistance (ESR), and polarity sensitivity are some of the drawbacks of AECs. There are critical needs to improve them. The applications and the corresponding customer needs can be divided into segments such as: (1) for compact, low-profile and other space-demanding applications, the low capacitance density and hence bulky size of AECs is the acute pain point that must be addressed; (2) for space undemanding but power or temperature demanding heavy-duty operations, the relative large thermal generation due to large ESR and high failure rate with limited lifetime of AECs are often complained by customers, but lack of alternative technologies to fulfill their needs. Surge, peak or pulse current caused polarity reverse also shortens the AEC lifetime; (3) in the emerging market of environmental energy harvesting for wearable electronics and internet of things (IoT) sensors, fast energy storage is in demand to efficiently store the pulse energy scavenged from environmental vibration, noise, or other sources. Compact size or slim/flexible format and efficiency are critical requirements, which AECs cannot meet with. Voltage spike in these applications can also easily cause polarity reverse and hence damage to the polar AECs; and (4) high-frequency and/or high-power pulse generation to drive actuators, for strobes or burst communication, or short pulse generation for wearable or implantable devices to provide aid or support the smooth functions of the muscle, organs, or heart such as cardiac pacemaker, compact size or slim/flexible format and efficiency are critical requirements, which AECs cannot meet with. On the other hand, when probably designed, the HF-supercapacitors can meet these application needs very well. Due to the fact that miniaturization and other high performance are highly valued in today's market, there are great needs for such HF-supercapacitors.

Since conventional supercapacitors can only run at very low frequency or quasi-DC condition, in the following, HF-supercapacitors are also called as AC-supercapacitors or "AC-supercaps". When there is no ambiguousness, they are also simply called as "cell".

SUMMARY OF THE INVENTION

The present invention relates to AC-supercapacitors (also referred to as "AC-supercaps") that runs at kHz frequencies and method of producing same. These AC supercaps are much smaller and have much better performance than commonly used aluminum electrolytic capacitors (AECs).

In general, in one embodiment, the invention features a method of making an AC-supercapacitor. The method includes selecting a material comprising polymer nanofiber network. The method further includes employing a plasma to pyrolyze the polymer nanofiber network to create a carbon nanofiber network (CNN) electrode material. The method further includes forming a CNN electrode from the CNN electrode material. The method further includes incorporating the CNN electrode in a cell package to form an AC-supercapacitor. The AC-supercapacitor is operable for running at frequencies of at least 0.1 kHz.

Implementations of the invention can include one or more of the following features:

The AC-supercapacitor can be operable for running at frequencies of at least 1 kHz.

The step of employing the plasma can include utilizing a microwave or RF or DC plasma system.

The method can further include placing the material into a plasma chamber. The method can further include that, during the step of employing the plasma, flowing a gas in the plasma chamber at a pressure of less than 50 Torr and then generating the plasma.

The gas can include only one or more non-carbon based gases.

The gas can include comprises at least one carbon based gas.

The carbon based gas can be not used as a carbon feedstock gas in the method.

The carbon based gas can be methane or acetylene.

The gas can further include $H_2$ or ammonia.

The polymer nanofiber network can include a cellulose polymer nanofiber network.

The cellulose polymer nanofiber network can be produced from a process comprising microbial fermentation.

The cellulose nanofiber network can include a bacterial cellulose aerogel.

The method can further include the step of forming the bacterial cellulose aerogel from a bacterial cellulose hydrogel.

The bacterial hydrogel can be synthesized bacterial cellulose cultivated using Kombucha strains.

The carbon nanofiber network can include cellulose nanofibers extracted from plants or biomass.

The carbon nanofiber network can include synthesized polymer nanofibers.

The synthesized polymer nanofibers can be one or different nanofibers.

The polymer nanofiber can be made from phenolic resin.

The polymer nanofiber can be made from polyimide or polyacrylonitrile.

The step of employing the plasma can occur for at least 5 minutes.

The step of employing the plasma can occur for at least 15 minutes.

In general, in another embodiment, the invention features a method of making an AC-supercapacitor. The method includes selecting a material comprising cellulose paper. The method further includes placing the cellulose paper within a plasma chamber. The method further includes flowing a gas comprising carbon feedstock gas into the plasma chamber. The method further includes employing a plasma within the plasma chamber to carbonize the cellulose and to deposit edge oriented graphene on the material to create an edge oriented graphene (EOG) electrode material. The method further includes forming a EOG electrode from the EOG electrode material. The method further includes incorporating the EOG electrode in a cell to form an AC-supercapacitor. The supercapacitor is operable for running at frequencies of at least 0.1 kHz.

Implementations of the invention can include one or more of the following features:

The AC-supercapacitor can be operable for running at frequencies of at least 1 kHz.

The step of employing the plasma can include utilizing a microwave or RF or DC plasma enhanced chemical vapor deposition system.

During the step of employing the plasma, flowing the gas in the plasma chamber can be at a pressure of less than 50 Torr.

The carbon feedstock gas can include methane or acetylene.

The gas can further include a non-carbon based gas.

The gas can further include $H_2$ or ammonia.

The step of employing the plasma can occur for at least 5 minutes.

The step of employing the plasma can occur for at least 15 minutes.

The EOG layer can include multiple atomic graphene layers.

The step of incorporating the EOG electrode in the cell to form the AC-supercapacitor can include stacking a plurality of EOG electrodes in the cell.

In general, in another embodiment, the invention features an AC-supercapacitor. The AC-supercapacitor includes a pair of carbon nanofiber network (CNN) electrodes, a separator to separate the electrodes, and electrolytes between the electrodes. The AC-supercapacitor is operable for running at frequencies of at least 0.1 kHz.

Implementations of the invention can include one or more of the following features:

The AC-supercapacitor can be operable for running at frequencies of at least 1 kHz.

The AC-supercapacitor can use aqueous electrolyte.

The AC-supercapacitor can use organic electrolyte.

The AC-supercapacitor can have a voltage operation window of at least about 2 V.

The CNN electrode can include carbonized bacterial cellulose aerogel.

The electrolyte can be an aqueous electrolyte.

The electrolyte can be an aqueous organic electrolyte.

In general, in another embodiment, the invention features an AC-supercapacitor. The AC-supercapacitor includes a pair of edge oriented graphene (EOG) electrodes, a separator to separate the electrodes, and electrolytes between the electrodes. The AC-supercapacitor is operable for running at frequencies of at least 0.1 kHz.

Implementations of the invention can include one or more of the following features:

The AC-supercapacitor can be operable for running at frequencies of at least 1 kHz.

The AC-supercapacitor can have a voltage operation window of at least about 2 V.

The EOG electrode can include carbonized cellulous paper.

The electrolyte can be an aqueous electrolyte.

The electrolyte can be an organic electrolyte.

The AC-supercapacitor can include a stack of EOG electrodes.

In general, in another embodiment, the invention features a device that includes one of the above above-described AC-supercapacitors.

Implementations of the invention can include one or more of the following features:

49. The device of claim 48, wherein the device is selected from a group consisting of consumer devices, medical devices, and defense devices.

The device can be selected from a group consisting of devices utilized in telecomm, industry, renewable energy, and power transmission infrastructures.

The can be selected from a group consisting of devices utilized in legacy electric systems for filtering, bypass, decoupling, and burst power functions.

The device can be a renewable energy device.

In general, in another embodiment, the invention features a method. The method includes utilizing an AC-supercapacitor running at a frequency of at least 0.1 kHz. The AC-supercapacitor includes a carbon nanofiber network (CNN) electrode.

Implementations of the invention can include one or more of the following features:

The method can include utilizing the AC-supercapacitor running at a frequency of at least 1 kHz.

The AC-supercapacitor can be utilized for ripple current filtering, power conditioning, energy storage, or pulse generation.

In general, in another embodiment, the invention features a method. The method includes utilizing an AC-supercapacitor running at a frequency of at least 0.1 kHz. The AC-supercapacitor includes an edge oriented graphene (EOG) electrode.

Implementations of the invention can include one or more of the following features:

The method can include utilizing the AC-supercapacitor running at a frequency of at least 1 kHz.

The AC-supercapacitor can be utilized for ripple current filtering, power conditioning, energy storage, or pulse generator.

BRIEF DESCRIPTION OF THE DRAWINGS

The foregoing and other objects, features, and advantages of the present invention will be apparent from the following description of embodiments as illustrated in the accompanying drawings, in which reference characters refer to the same parts throughout the various views. The drawings are not necessarily to scale, emphasis instead being placed upon illustrating principles of the present invention:

FIG. 5A is a graph of a Nyquist impedance plot of the electrochemical impedance spectroscopy (EIS) characterization of an AC-supercap cell made from EOG electrodes.

FIG. 5B is a graph of a Bode plot of an AC-supercap cell having EOG electrodes.

FIG. 6A is a graph showing the capacitance of the EOG electrode materials at different frequencies for 1, 2, and 3 layered EOG electrode material sheets.

FIG. 6B is a graph showing the dependence of areal capacitance on layer number (1, 2, and 3 layers) at three frequencies to show the sub-linear increase of capacitance with EOG electrode material layers.

FIG. 11A is a Nyquist plot of the cell spectra, with the high-frequency region shown in the inset 1101. FIG. 11B is a graph showing dependence of cell phase angle and electrode capacitance on frequency.

FIG. 11C shows cell phase angle vs. frequency. FIG. 11D shows areal capacitance vs. frequency.

FIG. 12A is a Nyquist plot of the cell spectra, with the high-frequency region shown in the inset 1201. FIG. 12B is the Bode plot of the spectrum.

FIG. 12 E is a graph of CV scans at 100 V $s^{-1}$ in different potential windows up to 3.5 V.

DETAILED DESCRIPTION OF THE INVENTION

Figure 1:
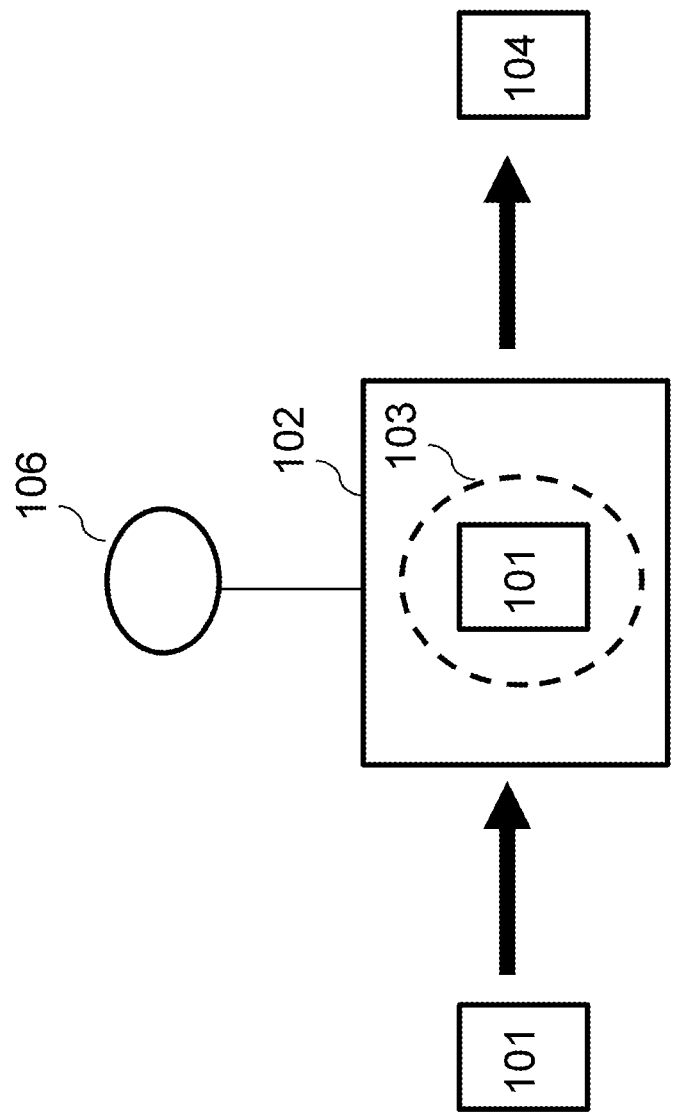
FIG. 1 is an illustration depicting a processes of the present invention to make an edge oriented graphene (EOG) electrode material.

The present invention are ultra-high rate (ultra-fast, high-frequency) supercapacitors that can respond at hundreds hertz or kilohertz frequencies (AC-supercapacitors). With a compact size, AC-supercaps can be used in lieu of ubiquitous (but bulky, high loss and low-performance) aluminum electrolytic capacitors (AECs), for line-frequency ripple current filtering, power conditioning, and many other functions needed in any electric power system design and electronic circuit design. This is a disruptive technology that has huge impacts on compact and efficient power supplies and power electronics. They are also suitable for pulse energy storage harvested form environment, for pulse power generation to drive actuators, for strobes or burst communication, or short pulse generation for wearable or implantable devices to provide aid or support the smooth functions of the muscle, organs, or heart such as cardiac pacemaker.

The electrode material and its nanostructure of the present invention provide the boost of the response frequency of the supercapacitors from quasi-DC (<a few Hz) to above 1 kHz AC. Due to the contradiction requirements of high frequency and high capacitance density, kHz AC-supercaps with much compact size and better performance over AECs have been constructed, including those with cutoff frequencies of more than 3 kHz and an areal capacitance of more than 3 $mF/cm^2$.

The electrodes utilized in the present invention can be formed by using edge orientated multilayer graphene that are grown around carbonized cellulous paper where the carbonization of the cellulous paper and graphene deposition are implemented in one step. The electrodes of the present invention can also be formed by using an interconnected carbon nanofiber based carbon nanofiber network (CNN).

Edge Oriented Graphene (EOG) Electrode Material

Flexible, thin, light, and freestanding edge oriented graphene (EOG) electrode materials, made from rich and renewable cellulose resource, are excellent and more practical electrodes for AC-supercapacitors.

FIG. 1A illustrates a method for creating edge oriented graphene (EOG) electrode materials. The method includes placing cellulose paper 101 (such as Kimwipes® wiper sheets) in a plasma chamber 102 that can create a plasma (such as a microwave plasma enhanced chemical vapor deposition (PECVD) system). Alternatively, a chamber that creates a RF or DC plasma can be employed. The plasma is represented by dashed circle 103. The plasma chamber 102 is pumped down to a low pressure (such as $1\times10^{-4}$ Torr). A gas including a carbon feedstock gas (such as a gas mixture of methane) from source(s) 106 is then flowed into the plasma chamber 102. For example, the chamber is refilled with a mixture of methane and $H_2$ gas at a pressure of 30 Torr. The temperature inside the chamber where the cellulose paper sits is controlled at a certain temperature (such as 750° C.). A certain (such as 1 kW) microwave radiation was applied to create plasma. Carbonization/graphitization of the cellulose paper and edge oriented graphene (EOG) is carried out simultaneously, such as in 1 kW $CH_4/H_2$ plasma for 5 minutes (which plasma was estimated to be at a temperature of around 1200° C. or higher).

In this process, the cellulose decomposed or reduced due to active hydrogen species in the plasma and converted into amorphous carbon and further partially graphitized due to high temperature, resulting in carbonized cellulose sheet (carbon fiber sheet with each fiber having a diameter such as several micrometers). Meanwhile, active carbon species from carbon feedstock plasma, assisted with hydrogen species, will deposit on the carbonized cellulose sheet forming perpendicularly oriented graphene flakes circling around each carbon fiber in the sheet, with graphene edges fully exposed, the so-called edge-oriented graphene network structure, or EOG. This resulted in EOG coated carbon fiber sheets 104 (also referred to herein as the EOG electrode materials).

Figure 2A:
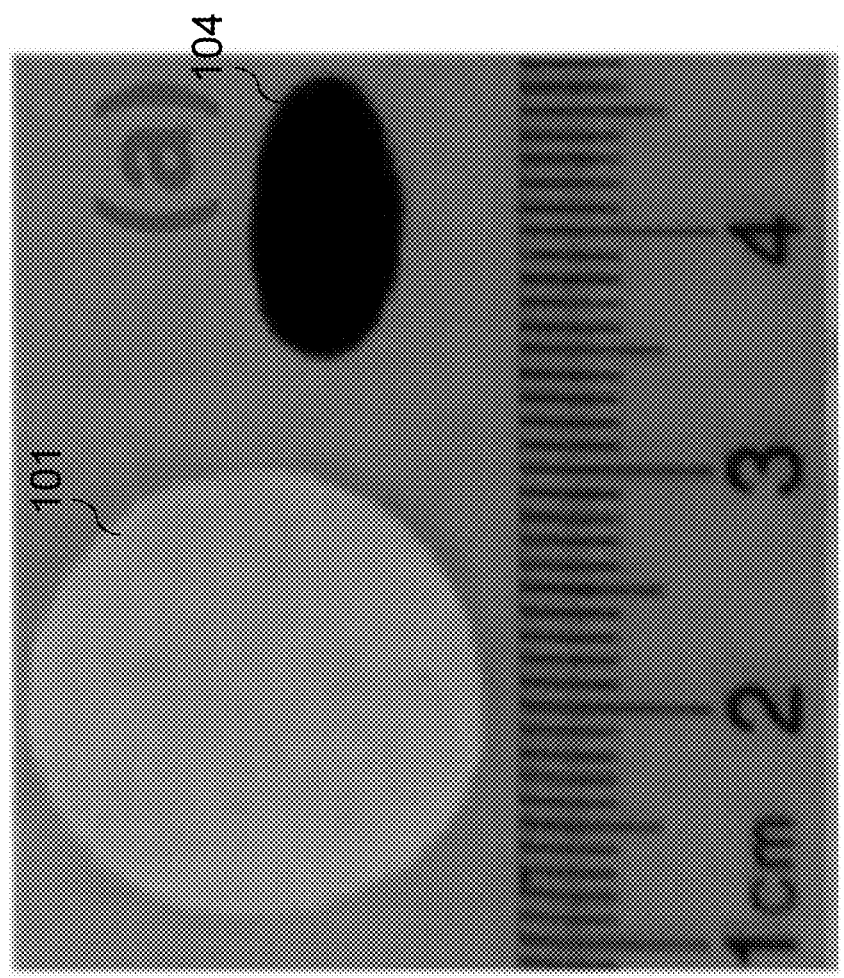
FIG. 2A is a photo image of cellulose paper and an EOG electrode material.
Figures 2B, 2C:
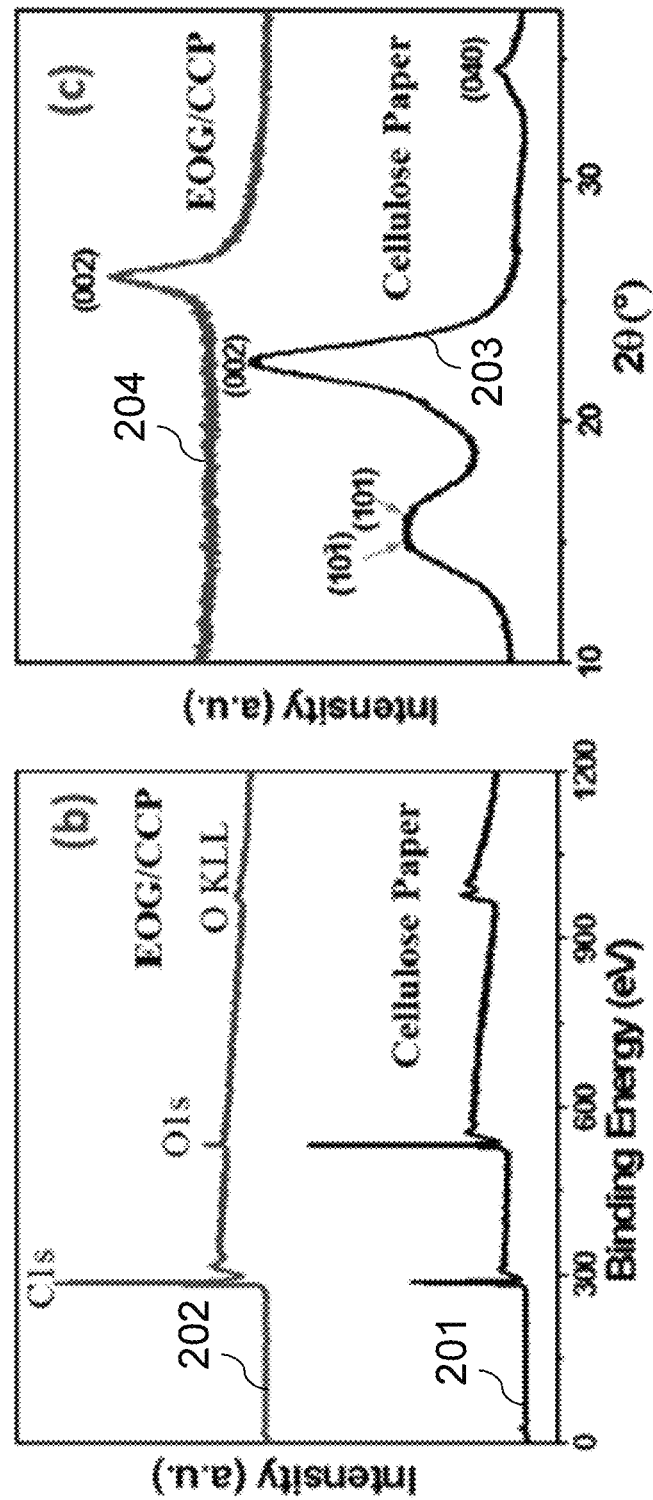
FIG. 2B is a graph of the XPS spectra of the cellulose paper and the EOG electrode material (labelled as EOG/CCP) to show the C/O composition ratio change.
FIG. 2C is a graph of the XRD patterns of the cellulose paper and the EOG electrode material.

With massive loss of oxygen and hydrogen and part of carbon compositions during plasma pyrolysis, the cellulose paper 101 and the EOG electrode material 104 exhibit very different morphology and composition. Such EOG electrode materials have a nominal area reduced by a factor of 5-6 (FIG. 2A) and mass density was changed from 2.1 mg $cm^{-2}$ to 1.1 mg $cm^{-2}$, as compared to the cellulose paper 101. The contraction of dimensions is anisotropic due to the cellulose texture of the cellulose paper 101. As shown in FIG. 2B, X-ray photoelectron spectroscopy (XPS) measurement was conducted to compare the composition change. For cellulose paper 101 (plot 201), the atomic ratio of oxygen over carbon is about 3:2, while it became 1:24 for EOG electrode material 104 (plot 202). The remaining trace amount of oxygen composition mainly exist in the C—O bonding form. The material structure was characterized by X-ray diffraction (XRD) and Raman spectroscopy. As shown in FIG. 2C, the cellulose paper 101 (plot 203) displays the characteristic XRD peaks of cellulose at 15.4°, 16.2°, 22.5°, and 34.5°. After pyrolysis and growth, the EOG electrode material 104 (plot 204) shows peaks at ~26.2°, corresponding to the characteristic (002) peak of graphite, indicating that the cellulose fibers were graphitized in the high-temperature EOG growth process.

In the Raman spectrum of EOG electrode material 104, characteristic D, G, 2D, and 2D' peaks of graphene/thin-graphite are clearly identified. The intensity ratio of 2D peak and G peak, $I_{2D}/I_G$, is ~1.31, suggesting that each graphene flake consists of multiple graphene atomic layer.

Figure 3A:
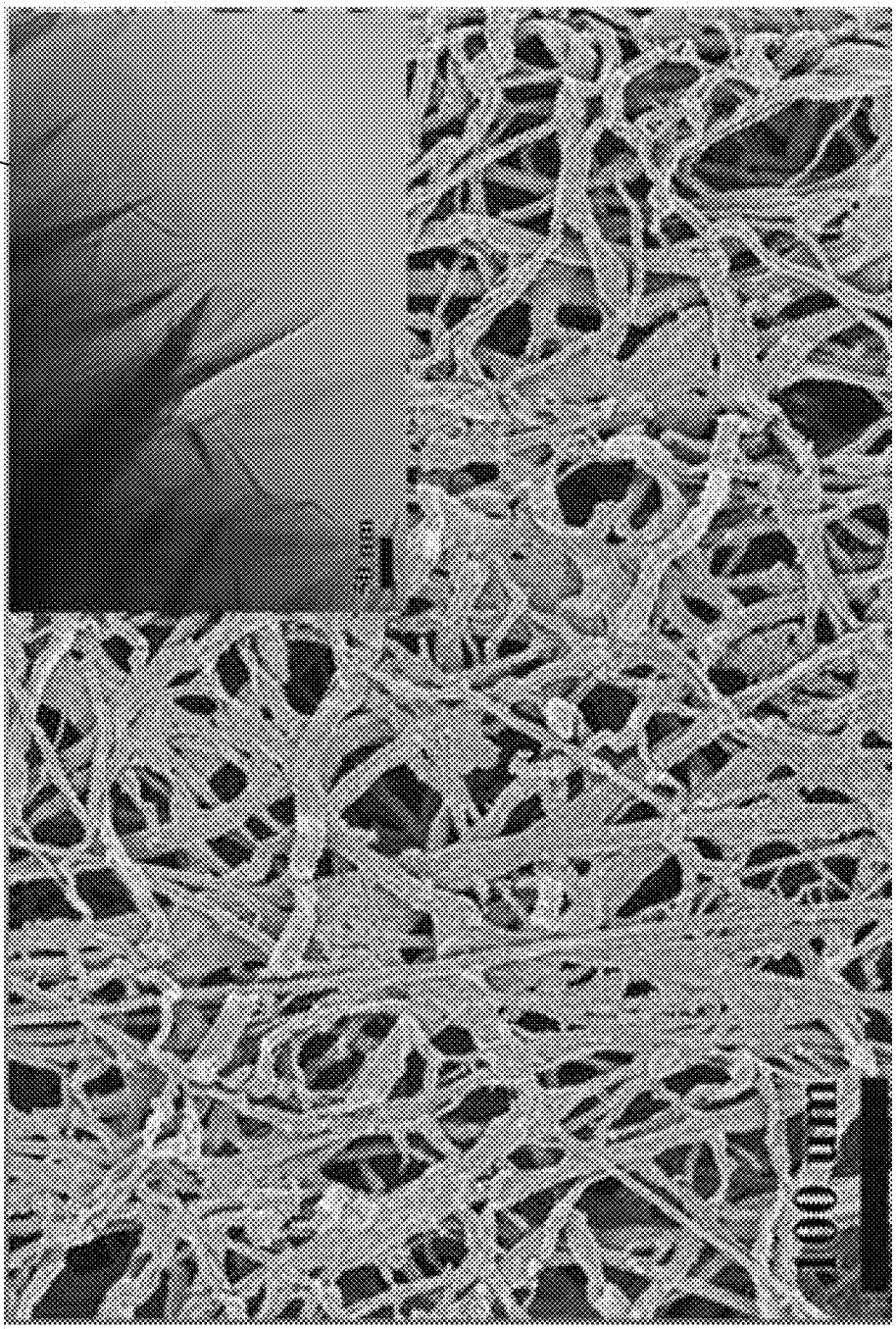
FIGS. 3A-3C are scanning electron microscope (SEM) images and transmission electron microscope (TEM) images of an edge oriented graphene (EOG) electrode material.
Figure 3B:
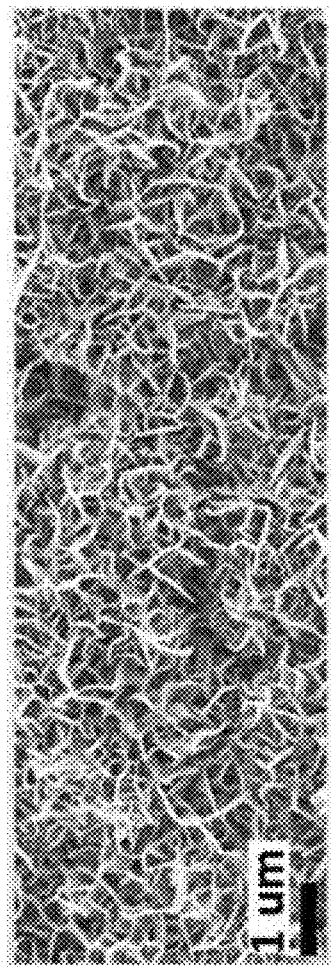
Figure 3C:
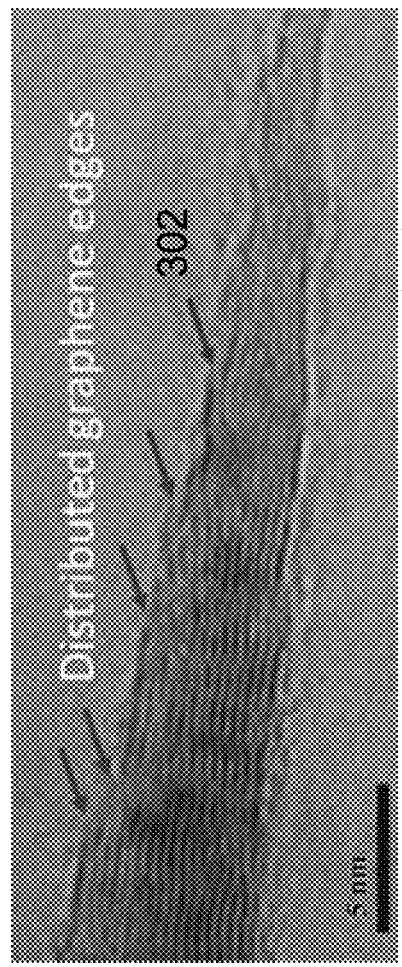

FIG. 3A (EOG coated carbon fiber sheet) and FIG. 3B (zoom-in on EOG) are a scanning electron microscope (SEM) images of an EOG electrode material made by the process shown in FIG. 1. Inset 301 (of FIG. 3A) and FIG. 3C are a transmission electron microscope (TEM) images of the EOG electrode material made by the first process. Arrows 302 point to the distributed graphene edges in the EOG electrode material.

Each individual carbon fiber has a size of a few micrometer in diameter, in contrast to the tens micrometer size of the pristine cellulose fiber. A single sheet of EOG electrode material is approximately 10 μm thick based on cross-sectional view of imaging. Most carbon fibers have a solid core, but some of them do have a hollow feature. The graphene flake network, with a maze-like morphology, has a height of several hundred nanometer and fully encompasses individual carbon fibers. The morphology of edge-oriented graphene flake network are further revealed by the TEM images.

Densely-packed graphene flakes grown on the surface of carbon fibers are displayed (FIG. 3B), while the perpendicularly oriented and fully exposed knife-like graphene edges are clearly observed in insert 301 of FIG. 3A. As shown in FIG. 3C, an individual graphene flake consisting of multiple atomic layer is shown in FIG. 3C, disclosing its tapered profile with a wide base and narrow tip, and along the perpendicular flake walls are distributed with dense graphene edge steps (arrows 302).

Such a freestanding network of the EOG electrode material combines several unique features together, very suitable for developing AC-supercaps with high capacitance density. First of all, the edge oriented graphene network provides high density and easily accessible graphene edges. These atomic edges or steps have rich adsorption sites for electrolyte ions, and therefore, offer much higher charge storage capacity than its basal plane. It was reported that the edge plane of graphite offers a capacitance of 50-70 $\mu F/cm^2$, around 20 times higher than its basal plane. The edge orientation of graphene flakes, with sub-μm flake height and wide opening channels between flakes, minimizes the porosity effect which otherwise would restrict ionic transport, and hence the high frequency response could be achieved. The well-connected EOG electrode material delivers a high electronic conductivity to minimize the series resistance.

Unlike previously reported VOG grown on a 2-D planar substrate with a limited surface area, EOG growth around the porous 3-D carbon fiber network offers a large surface area for a given footprint, particularly the micrometer-size macropores (FIG. 3A) allow the EOG electrode materials to stack together without sacrificing frequency response. Therefore, a large areal capacitance, as well as a large volumetric capacitance and a large mass-specific capacitance is achieved by further considering their small volume and low mass.

Figure 4:
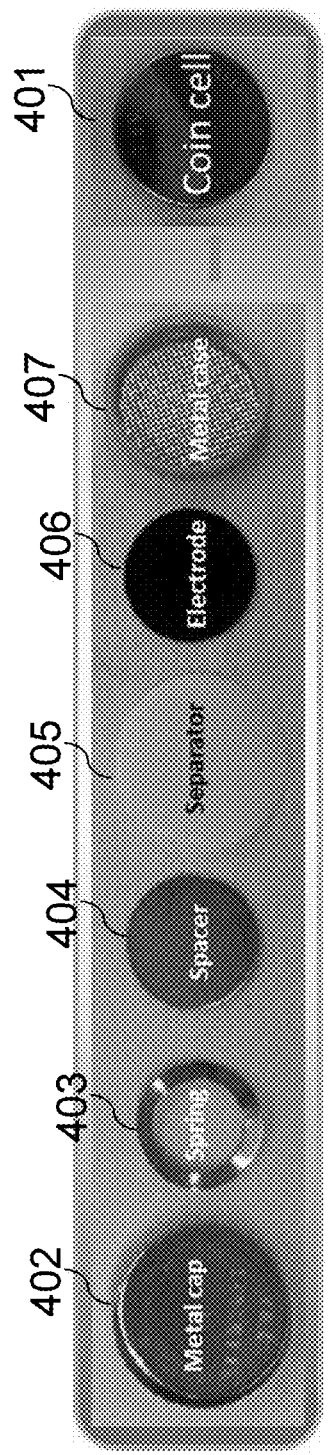
FIG. 4. shows an AC-supercap packaged into coin cell form that was made using electrodes of the present invention.

FIG. 4 shows a AC-supercap, packed into coin cell form 401 that can be made that includes two same electrodes 406, which can be made from the EOG electrode material 104. Such coin cell 401 further includes a metal cap 402, a spring 403, a spacer 404, a separator 405, the electrodes 406, and a metal case 407. Not shown are the electrolyte which is soaked in the porous separator and the two electrodes with macro-pores.

For example, coin cells 401 were made utilizing the EOG electrode material 104 made as described above, as follows: Using a single sheet EOG electrode material 104 with a thickness of 10 μm as the electrodes 406 (cut to the proper size), symmetric cells (e.g., two electrodes are the same) were assembled to test their performance. The electrodes 406 (the EOG electrodes) were soaked in an aqueous electrolyte (6 M KOH aqueous electrolyte) for 12 hours and then assembled in coin cells 401 with a 25 μm thick separator.

The stability of the aqueous electrolyte was found to limit the working voltage to less than ~0.9 V.

Figures 5C, 5D:
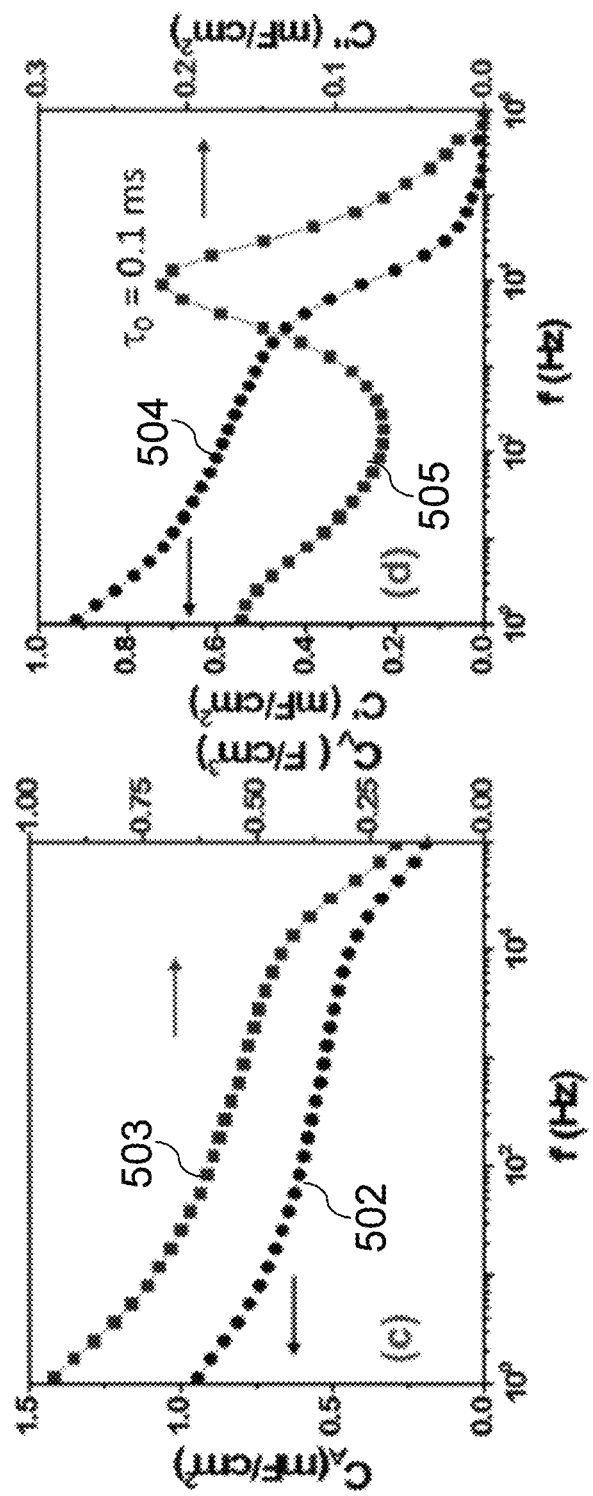
FIG. 5C is a graph showing the calculated areal and volumetric capacitances of the EOG electrode at different frequency.
FIG. 5D is a graph showing the dependence of real (C') and imaginary part (C") of the electrode areal capacitance on frequency.

The Nyquist plot of the measured impedance $Z(\omega)$ is shown in FIG. 5A, with an expanded view of high frequency part in the inset 501. The plot displays a nearly vertical straight line at a frequency below 29 kHz, behavior of a near-ideal capacitor connected with an equivalent series resistance (ESR). At high frequency, it has a small Warburg 45° line region and a tiny curvature. A Warburg line region and a large semicircle are common features of porous electrodes. Here due to the wide opening between perpendicular graphene flakes, the microporous effect, which limits the frequency response, is significantly inhibited. Only low density of pores exists in the EOG electrode material structure, due to either hollow fibers or expanded spacing between atomic graphene layers, which contributes the tiny Warburg line and curvature region at frequency above 29 kHz. ESR, indicated by the intersection of impedance curve with the Z' real axis is 79 mΩ for such a cell with an electrode nominal area of 0.5 cm$^2$, which is similar to or smaller than that of other ultrafast capacitors based on VOG, graphene foam and graphene hydrogel. ESR of a capacitor will ultimately determine its frequency response when considering the effect of RC constant, and a small ESR is critical for high frequency response AC-supercaps. Such a low ESR suggests a highly conductive network offered by the EOG electrode materials for electrons while its porous structure facilitating the electrolyte ion transport.

The corresponding impedance phase angle data vs. frequency (Bode plot) is shown in FIG. 5B. An ideal capacitor, with its impedance of $1/j\omega C$, exhibits 90° phase angle, while in a real supercapacitor, due to the resistive component (R), the phase angle will be lower, particularly at high frequencies. Therefore, the frequency $f_0$, corresponding to 45° phase angle of the impedance $(R+1/j\omega C)$, delineates the frequency boundary, below which the device behaves more like a capacitor, while above which, it manifests more like a resistor. Therefore, $f_0$ can be defined as the characteristic cutoff frequency of capacitors. Of course, the capacitor should work at a frequency below $f_0$ with a large absolute value of phase angle (~>80°) in minimizing resistive energy loss. It is noted that the AC-supercap cell having EOG electrodes shows an absolute value phase angle above 80° up to a frequency of ~1 kHz, and a characteristic cutoff frequency of ~10 kHz. Outside of the Warburg region in Nyquist plot of its impedance, the cell can be simplified as a resistance and a constant phase element (CPE) in series. If the CPE exponent is assumed to be 1, this becomes the commonly used series RC model as an approximation. Then the frequency-dependent areal capacitance of the electrode can be derived as:

$$C_A = (-1/\omega Z'') \times (2/A) = -2/\omega Z''A \quad (1)$$

where A is the footprint area of EOG electrode. The derived areal and volumetric capacitances per electrode are plotted in FIG. 5C (plots 502 and 503, respectively, based on series RC model using Eq. 1). At 120 Hz, these two numbers are 0.6 mF cm$^{-2}$ and 0.6 F cm$^{-3}$ for the EOG electrodes. The corresponding phase angle at 120 Hz is −83°, comparable with the state of the art such as VOG on Ni substrate (−82° to −85°), POG in Ni foam (−82°), electro-chemically reduced graphene oxide (ErGO) on Au (−84°), and patterned graphene CNT on metal coated silicon (−81.5°), but with a much larger volumetric capacitance when the whole electrode volume is considered. Not shown here, the areal and volumetric capacitances have been further increased to more than 1 mF cm$^{-2}$ and 1 F cm$^{-3}$ for the EOG electrodes after optimizing the deposition process.

The frequency-dependent capacitance can also be estimated based on the method of Taberna et al., "Electrochemical Characteristics and Impedance Spectroscopy Studies of Carbon-Carbon Supercapacitors" *J. Electrochem. Soc.* 2003 150, A292-A300 to define complex capacitance $C_C(\omega)$ as:

$$C_C(\omega) = C'(\omega) - (jC''(\omega)) = 1/j\omega Z \quad (2)$$

where $C'(\omega)$ is the accessible capacitance at the corresponding frequency, while $C''(\omega)$ corresponds to energy dissipation due to irreversible process (resistive loss). The evolution of $C''(\omega)$ with frequency reaches a maximum at the cutoff frequency $f_0$ that defines the relaxation time constant $\tau_0$. The electrode areal capacitance, calculated as $C_A=2C'/A$, and C0'' are plotted in FIG. 5D (plots 504 and 505, respectively, obtained from Eq. 2). Again, an electrode capacitance of ~0.6 mF cm$^{-2}$ is obtained at 120 Hz, which is consistent with the number extracted from the series-RC model in Eq. (1). Furthermore, the plot shows that $C''(\omega)$ reaches a maximum at the cutoff frequency ~10 kHz, which gives a relaxation time constant of ~0.1 ms. This value is orders lower than most reports on high-rate supercapacitors, such as onion-like nanocarbon (26 ms), graphene film (13.3 ms), graphene-conducting polymer (1.0-2.9 ms), comparable or better than the state-of-the-art of high-frequency supercapacitors based on ErGO/Au (0.17-1 ms), POG in Ni foam (0.248 ms), or VOG on Ni substrate (0.067 ms).

One motivation to develop AC-supercap is to replace the bulky AEC by compact AC-supercap for AC line-frequency current ripple filtering or other high-frequency applications. Therefore, these AC-supercaps must have a compact size with a large volumetric capacitance in term of the whole package. Therefore, the active material should have enough loading in the electrode when considering the inactive volume in a packed cell. Most reports in the literature, based on sub-μm thick active layers, significantly fall short in this aspect. It is obvious that for a thick active layer to response in the kHz range, macropores are necessary for free electrolyte ions transporting deeply into the thick layer. The macropores in the hierarchical EOG electrode material might afford this capability even when several sheets are stacked together for a thicker electrode that is necessary for practical devices with a large capacitance. Therefore, the cell performance of electrodes based on 1-, 2-, and 3-layered sheets of EOG electrode material were tested and compared.

In FIG. 6A, frequency-dependent areal capacitances (plots 601-603 for 1-, 2-, and 3-layers, respectively), based on EIS measurement and further derived from Eq. (2) are compared, and particularly the areal capacitances at 10, 120, 1000 Hz are plotted in FIG. 6B (plots 604-606, respectively). From 1-layer, 2-layer, to 3-layer, the 120 Hz areal capacitance increases from 0.6 mF cm$^{-2}$ to 1.1 and then 1.5 mF cm$^{-2}$, and 1 kHz capacitance is 0.5, 1.0, and 1.4 mF cm$^{-2}$, respectively, nearly proportional to the number of layers, and therefore the volumetric density only has slight degradation as the layer number increases. The same is also true for other frequencies.

Figure 6C:
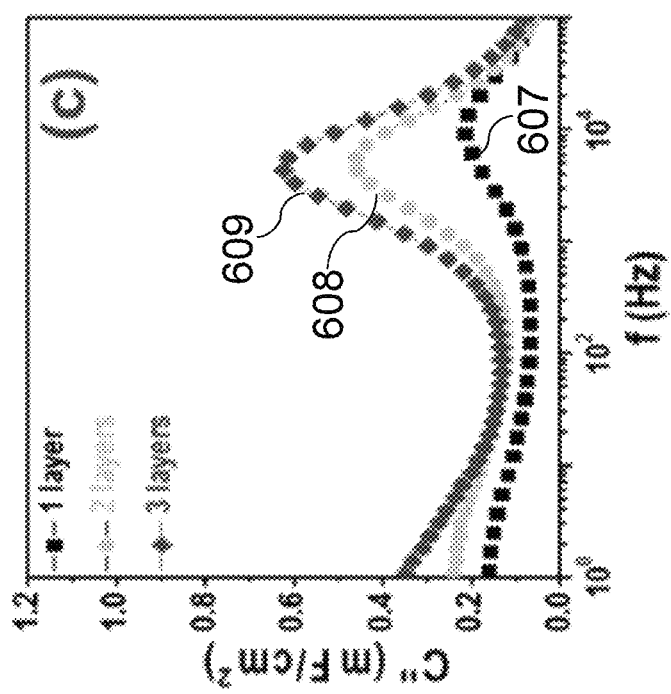
FIG. 6C is a C"(ω) plot for the 1, 2, and 3, layered EOG electrode material sheets.

The cutoff frequency and relaxation time constant, as indicated by FIG. 6C (plots 607-609 for 1-, 2-, and 3-layers, respectively), only have slight degradation as electrode thickness increases. Particularly, the cutoff frequency changes from ~10 kHz to ~5 kHz, when the EOG electrode increases from 1-layer to 2-layer, while there is no further obvious change from 2-layer to 3-layer. This nonlinear change of cutoff frequency is believed to be related to the cell assembling process. When several layers are stacked to form one electrode, the mechanical force applied may have significant impact on the contact resistance between layers.

However, as far as a good contact is established between these stacked layers, the EOG electrode based cells, even with a large electrode thickness, are capable to achieve high frequency response with a cutoff frequency above kHz range. In other embodiments, the starting cellulose paper can be much thicker than utilized in the embodiments tested above. In such case one layer would be thick enough as electrode and there would be no layer-to-layer contact issue.

Carbon Nanofiber Network (CNN) Electrode

Through a rapid plasma pyrolysis process, a carbon nanofiber network (CNN) electrode material, which consists of interconnected carbon nanofibers (such as a carbonized bacterial cellulose (CBC) aerogel) is suitable as electrode for kHz AC-supercap with extremely large areal capacitance (at 120 Hz). The voltage operation window can be increased to ~3 V when an organic electrolyte used (instead of an aqueous electrolyte). Their excellent performance is attributed to the suitable pore size and well-crosslinked nanofiber structure of CNN electrode material (such as CBC aerogel) that can simultaneously offer a high ionic conductivity for the electrolyte in the porous electrode, a high electronic conductivity and a large surface area, resulting in high frequency response and large areal capacitance. The potential of these AC-supercaps for current ripple filtering in AC/DC converter and high-frequency pulse energy storage has been demonstrated, showing that these AC-supercaps can be utilized in these and other similar applications.

Figure 7:
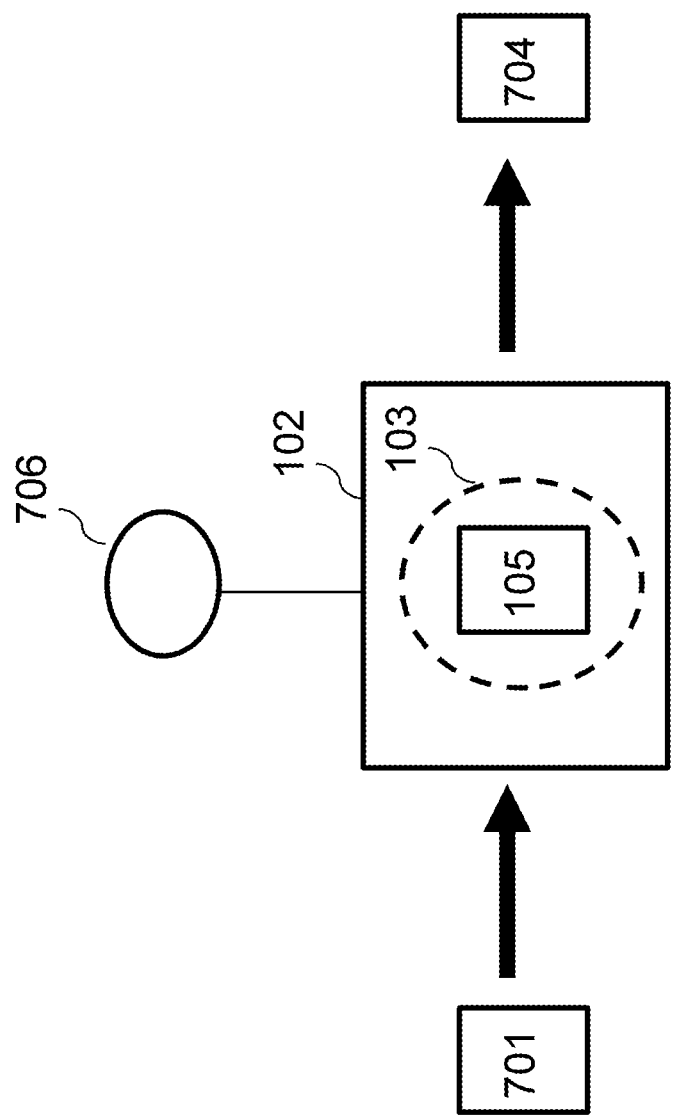
FIG. 7 is an illustration depicting a processes of the present invention to make a carbon nanofiber network (or nanoweb) (CNN) electrode material.

FIG. 7 illustrates a method for creating carbon nanofiber network (CNN) electrode materials. The method includes placing cellulose nanofiber network 701 (such as produced by a microbial fermentation process) in a plasma chamber 102 that can create a plasma (such as a microwave plasma system). The plasma is represented by dashed circle 103.

The cellulose nanofiber network produced by microbial fermentation can be bacterial cellulose (BC) cultivated using Kombucha strains (the method used for production of Kombucha tea), as described in Zhu, C. et al., "Kombucha-synthesized bacterial cellulose: Preparation, characterization, and biocompatibility evaluation," *Journal of Biomedical Materials Research Part A* 2014, 102 (5), 1548-1557.

For example, black tea (5 g) was boiled in 500 mL water for 5 min to obtain tea solution. After cooling down, 100 g sucrose, 5 g yeast extract, and 0.5 g peptone were added to the tea. By adding water and acetic acid, 1 L culture solution was made with a pH value of 5.0. Using a shallow glass container, the Kombucha strains were cultured in the solution for several days or weeks, depending on the BC pellicle thickness required. The cultivation temperature was maintained at ~30° C. The obtained new pellicles were washed with water to remove the culture solution and then boiled in 1.0% NaOH solution for 2 h to eliminate the bacterial cells. After washing in de-ionized water, BC hydrogels were obtained.

Figure 8B:
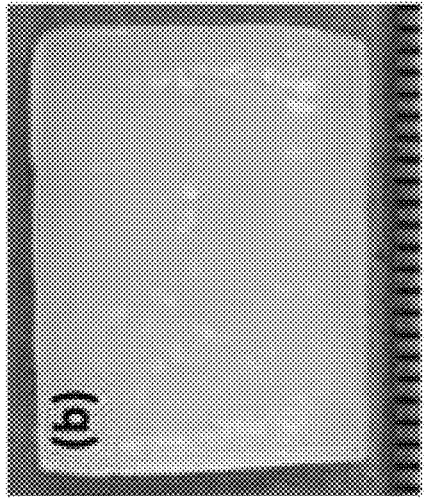
FIG. 8B is a photo of a piece of BC hydrogel made from the BC pellicle shown in FIG. 8A.
Figure 8D:
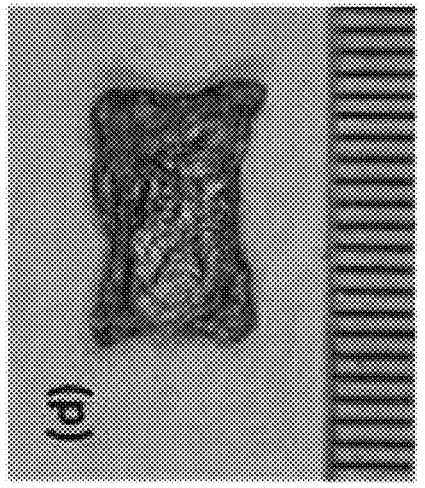
FIG. 8D is a photo of carbon nanofiber network (CNN) electrode material made from the BC aerogel shown in FIG. 8C.
Figure 8A:
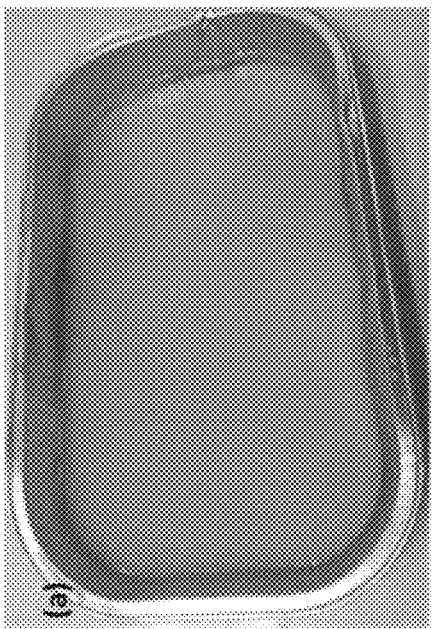
FIG. 8A is a photo of bacterial cellulose (BC) pellicle cultivated in container.

FIG. 8A is a photo of the BC pellicle cultivated in a container. FIG. 8B is a photo of a small piece of BC hydrogel after cleaning made from this BC pellicle.

Figure 8C:
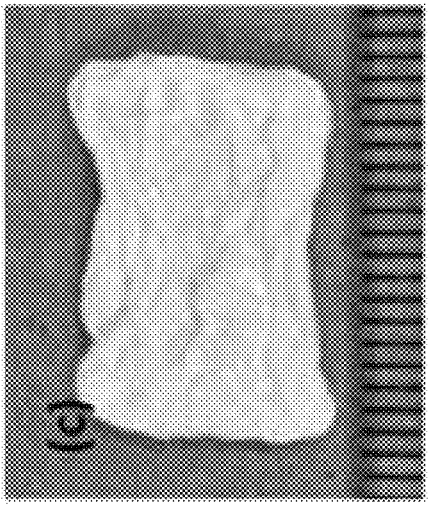
FIG. 8C is a BC aerogel made from the BC hydrogel shown in FIG. 8B.
Figure 9A:
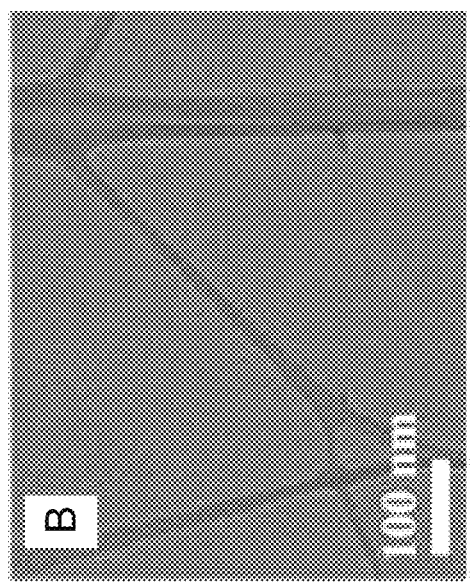
FIGS. 9A-9C are scanning electron microscope (SEM) images and transmission electron microscope (TEM) images of the BC aerogel shown in FIG. 8C.
Figure 9B:
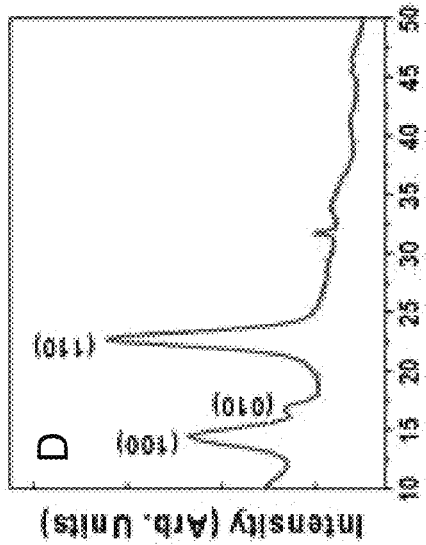
Figure 9C:
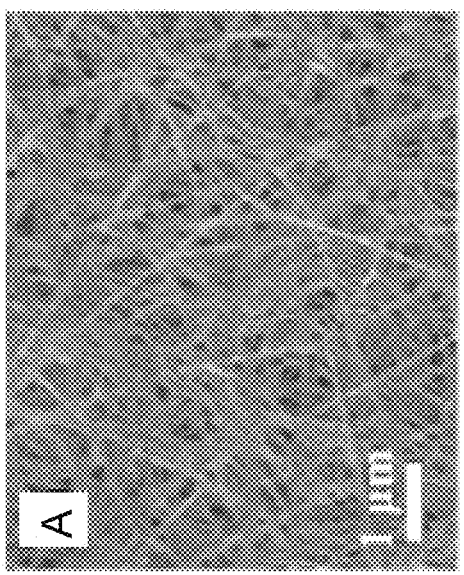

The BC aerogel is then formed from the BC hydrogel. For example, this can be done by freeze drying the BC hydrogel dried at −80° C. overnight followed by vacuum drying to remove all water content to obtain BC aerogels such as a tiny piece shown in FIG. 8C. The BC aerogel has a mass of less than 1% of its hydrogel counterpart. FIG. 9A is an SEM image of the BC aerogel shown in FIG. 8C. FIGS. 9B-9C are TEM images of the BC aerogel shown in FIG. 8C. The SEM of FIG. 9A image reveals the three-dimensional web structure of BC aerogel, while the crosslink between nanofibers or branch structure is noted in the TEM image (FIG. 9B). While other natural celluloses can be used in embodiments of the invention, the BC aerogel is performed over other natural celluloses due to smaller fiber size (around 10-50 nm) and higher degree of crystallinity and purity.

Figure 9D:
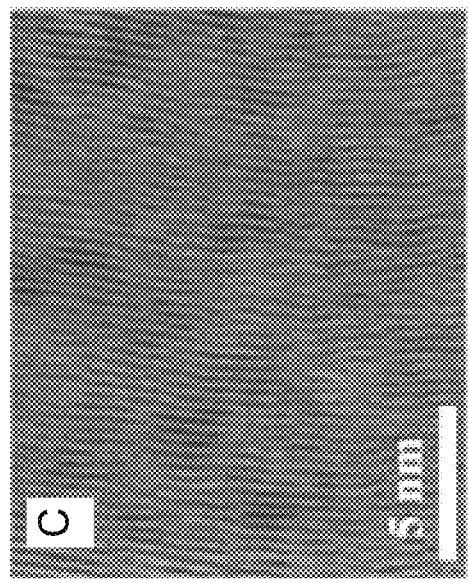
FIG. 9D is a graph of an XRD pattern of the BC aerogel shown in FIG. 8C.

The x-ray diffraction (XRD) pattern (FIG. 9D) indicates good crystallization of the cellulose. According to the cellulose $I_\alpha$ a indexation, the three peaks corresponding to $2\theta$ diffraction angles of 14.45, 16.75 and 22.75° are indexed to (100), (010) and (110) crystallographic planes. The high-resolution TEM image (FIG. 9C) shows the (110) lattice planes with a plane spacing of 0.38 nm. The crosslinked gel structure of BC is expected to yield excellent intra-electrode conductivity after pyrolysis. These nanoscale fibers also offer larger surface area compared to other cellulose materials composed of microscale large fibers.

Pyrolysis of synthesized polymer and cellulose polymer precursors, including BC, to derive carbon material has been commonly conducted in a thermal process with $N_2$ or Ar environment at temperature more than 800° C. for a few to more than 10 hours. Micropore activation during this long-duration thermal process, through physical decomposition and chemical etching is also a very common practice for achieving a large surface area for electrode applications. However, this energy-consuming thermal pyrolysis process to introduce micropores, is detrimental for the electrode frequency response, and therefore is not suitable for AC-supercaps.

Referring back to FIG. 7, the cellulose nanofiber network 701 (such as the BC aerogel shown in FIG. 8C) is placed in plasma chamber 102 and an RF or microwave plasma is employed, such as a microwave plasma using a microwave plasma chemical vapor deposition system. The plasma chamber 102 is pumped down to a low pressure (such as $1\times10^{-4}$ Torr). However, different than the processes illustrated in FIG. 1 for the EOG electrode material, the gas that is used to flowed into the plasma chamber 102 from source(s) 706 are is not used as carbon feedstock gas (i.e., no carbon deposition from the carbon feedstock gas). Nonetheless, gases with carbon (such as methane) can be, and are, utilized in embodiments of the present invention. To avoid carbon deposition from the hydrocarbon plasma source that could block the pores in the carbonized BC aerogel and result in low frequency response, the BC aerogel had no direct exposure to the plasma through a graphite screening sheet.

For example, the chamber is refilled with a mixture of methane (50 sccm) and $H_2$ (100 sccm) at a pressure of 30 Torr. The temperature inside the chamber is controlled at 750° C. 1 kW microwave radiation was applied to create plasma. It was observed that a short period (15 minutes) of plasma pyrolysis of the cellulose nanofiber network 701 produced carbon nanofiber network (CNN) electrode material 704 with excellent electronic conductivity, large interconnected pores for rapid electrolyte ion migration, and reasonable surface area. Without employing any further treatment, such as structural modification, doping of electrode material or applying metallic current collector that were commonly used in other studies, the obtained carbon nanofiber network (CNN) electrode material 704 was demonstrated to be very suitable for AC-supercaps. FIG. 8D is a photo of the carbon nanofiber network (CNN) electrode material 704 formed by this process.

Figures 10A, 10B:
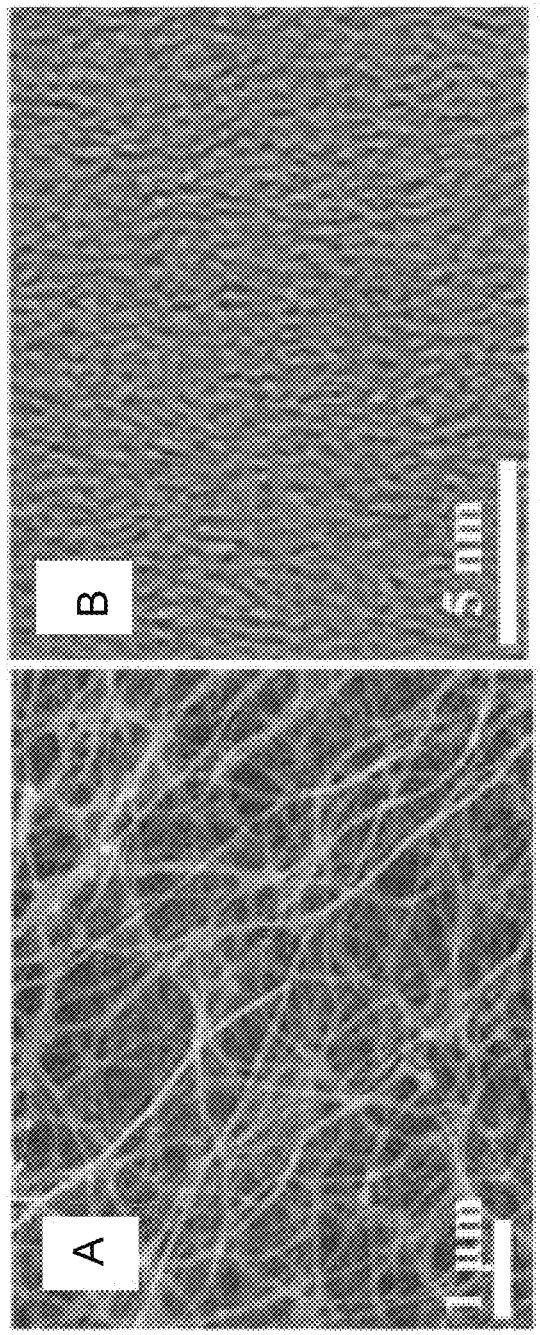
FIGS. 10A-10B are scanning electron microscope (SEM) and transmission electron microscope (TEM) images of a carbon nanofiber network (CNN) electrode material.

After plasma pyrolysis, the carbon nanofiber network (CNN) electrode material 704 area was shrunk to about 30% and the mass was largely reduced. The morphology of the CNN electrode material 704 is shown in the SEM image of FIG. 10A. The overall structure is highly porous network with meso- and macro-pores formed by the well-connected carbon nanofibers (CNF). The textural properties of CBC membrane were further characterized by $N_2$ sorption measurements. A Brunauer-Emmett-Teller (BET) surface area of 57.5 m$^2$ g$^{-1}$ was measured, with a pore volume of 0.374 cm$^3$ g$^{-1}$. The pore size distribution showed a minimum pore diameter of 3.8 nm and the CNN electrode material was dominated by meso- and macro-pores. Without micropores, slit pores, and dead end pores, the interconnected large pores allows rapid transportation of ions in electrolyte through the electrode mesh with a low ionic resistance. Unlike a cluster simply stacked by individual CNFs or CNTs that has no intimate mechanical and electrical connection between individual fibers, well-connected CNN electrode material gel is formed by the branch structure of fibers with intrinsic connection. Such a unique branched web-like CNN electrode can simultaneously offer a high ionic conductivity and a high electronic conductivity, essential for high frequency response in a 3D distributed electrode. The derived CNN electrode material is amorphous carbon (FIG. 10B) without showing XRD peaks, and some of them have a tubular-like or sheath structure.

Such CNN electrode material can also be incorporated into a coin cell, such as shown in FIG. 4.

Aqueous Electrolyte Cells

CNN electrodes were studied with three different thicknesses of 10, 20 and 60 μm, named as CBC-10, CBC-20 and CBC-60, respectively. ("CBC" stands for carbonized BC) The performance of these electrodes was evaluated in 6M KOH aqueous electrolytes. The frequency dependent behaviors were characterized via electrochemical impedance spectroscopy (EIS) measured form 100 kHz to 1 Hz, with a sinusoidal AC voltage of 10 mV amplitude, using the assembled symmetric coin cells.

Figures 11A, 11B:
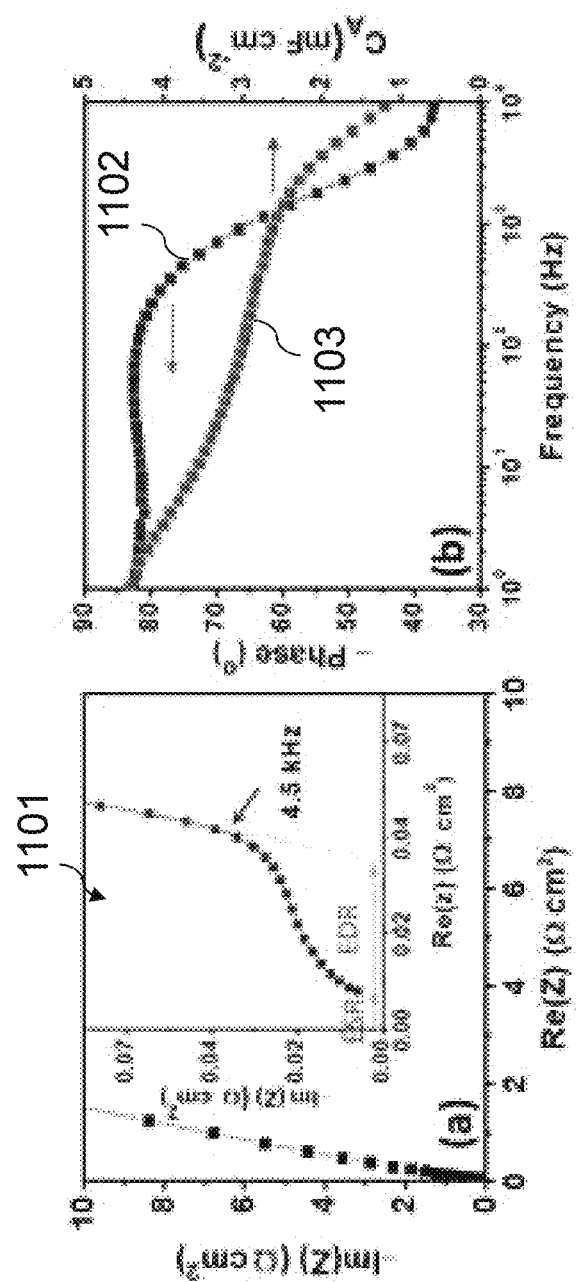
FIGS. 11A-11B are graphs of EIS spectra and capacitance of CNN electrode (thickness 20 μm) based aqueous cells.

The Nyquist plot of EIS for CBC-20 based aqueous cells is presented in FIG. 11A, with the zoom-in view of the high frequency region shown as the inset 1101. A knee frequency of ~4.5 kHz is noted. Below this frequency, the spectrum is approximately a straight line with a slope approaching 90°, and therefore the cell can be approximated by RC in series. Above the knee frequency, a transition region and a semicircle feature might be identified, which is ascribed to the distributed capacitance and resistance of the porous CNN electrode, a possible minor insulating layer between the coin cell package and the free-standing CNN electrode that has no extra current collector, and possibly the minor charge transfer at the electrolyte and electrode interface due to small fraction of oxygen-related remnants in CBC. These features result in a small equivalent series resistance (ESR) of 9 mΩ·cm$^2$ in conjunction with an equivalent distributed resistance (EDR) of 26 mΩ·cm$^2$.

The Bode plot of the same EIS spectrum is presented in FIG. 11B (plot 1102), indicating the absolute value of the phase angle generally is above 80° for frequencies up to a few hundred Hz. In particular, the cell at 120 Hz show a phase angle of −82°, indicating that it maintains the capacitive nature very well at such a frequency. The characteristic frequency at −45° is around 3.3 kHz.

Using the RC model, the capacitance below the knee frequency was calculated and the dependence of the areal capacitance ($C_A$) of CBC-20 electrode on frequency is also shown in FIG. 11B (plot 1103). An electrode areal capacitance as large as 2.98 mF cm$^{-2}$ at 120 Hz was measured. The RC time constant at 120 Hz is 0.18 ms.

Figures 11C, 11D:
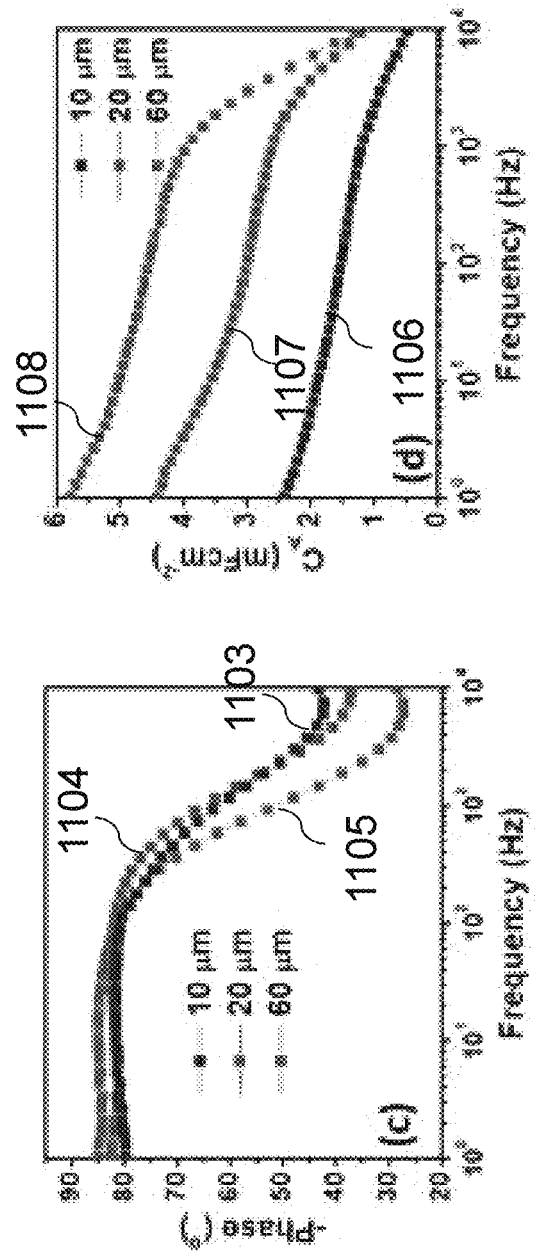
FIGS. 11C-11D are graphs showing a comparison of the three CNN electrodes with different thickness in the aqueous electrolyte.

The electrode thickness effect on capacitance and frequency response are presented in FIGS. 11C-11D for the three thicknesses of the CNN electrodes. For FIG. 11C, plots 1103-1105 are for thickness of 10, 20 and 60 μm, respectively. For FIG. 11D, plots 1106-1108 are for thickness of 10, 20 and 60 μm, respectively. For a frequency up to 200 Hz, these generally shows a phase angle between −80° to −90°, and the characteristic frequency at −45° phase occurs at 4.1, 3.3 and 1.3 kHz for CBC-10, CBC-20 and CBC-60, respectively. In particular, the area capacitance at 120 Hz is 1.51, 2.98 and 4.50 mF cm$^{-2}$ for the three electrodes. It is noted that for the two thinner electrodes, the volumetric capacitance maintains a constant (~1.50 mF cm$^{-3}$) with the areal capacitance linearly increasing. Although CBC-60 gives a very high values for areal capacitance, its volumetric counterpart (0.75 mF cm$^{-3}$) falls lower compared to the thinner ones. CBC-20 offers a large areal capacitance while maintaining the volumetric efficiency.

Figure 11E:
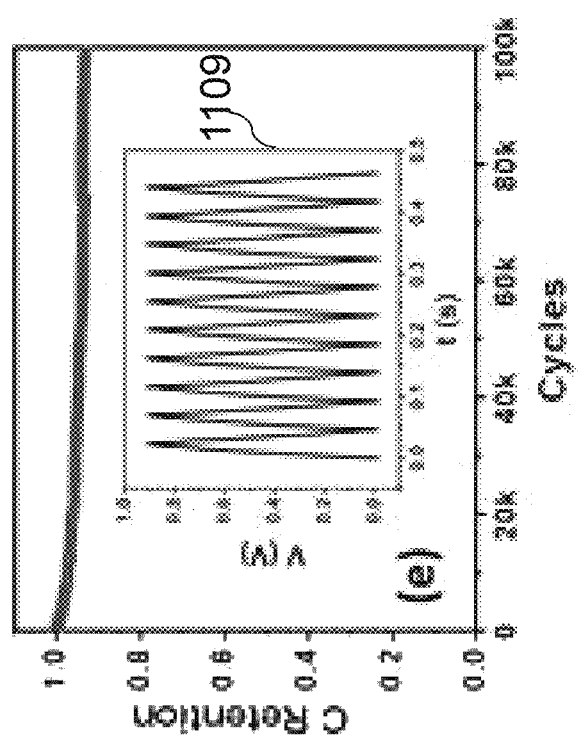
FIG. 11E is a graph that shows capacitance cycling stability tested for a CNN electrode (thickness 10 μm) based aqueous cell at 50 mA $cm^{-2}$, with the inset 1109 as a section of the C-D curve.

Cyclic voltammetry (CV) and Galvanostatic charge-discharge (C-D) cycling was further studied. Capacitance cycling stability was tested for a CBC-10 aqueous cell (FIG. 11E). After 100,000 continuous cycles with full charge and discharge, the capacity was maintained at a value approximately 95% of its initial capacity. Very few studies on high-frequency supercapacitors reported such long-cycling stability. The slight degradation of the capacitance might be related to aqueous electrolyte evaporation due to packaging.

Organic Electrolyte Cells

Figures 12A, 12B:
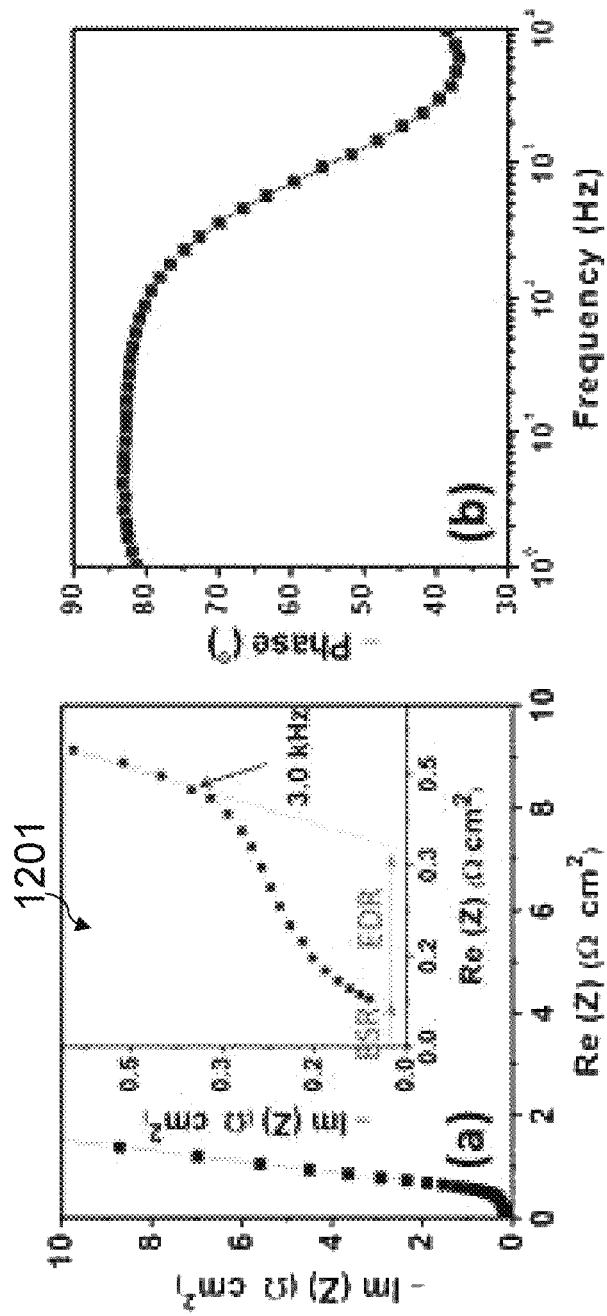
FIGS. 12A-12B are graphs of EIS spectra and capacitance of CNN electrode (thickness 10 μm) based organic electrolyte cells.

CBC-10, CBC-20 and CBC-60 three electrodes were also studied in organic electrolyte (such as 1 M tetraethylammonium tetrafluoroborate (TEABF4) in anhydrous acetonitrile (AN) solution). FIG. 12A is the complex-plane impedance spectrum for a CBC-10 based organic cell. A knee frequency of 3.0 kHz was found, below which the spectrum can be approximated by a RC series model. The sum of ESR and EDR is approximately 0.33 Ω·cm$^2$. The plot of phase vs. frequency in FIG. 12B indicates a phase angle of −80° at 120 Hz.

Figures 12C, 12D:
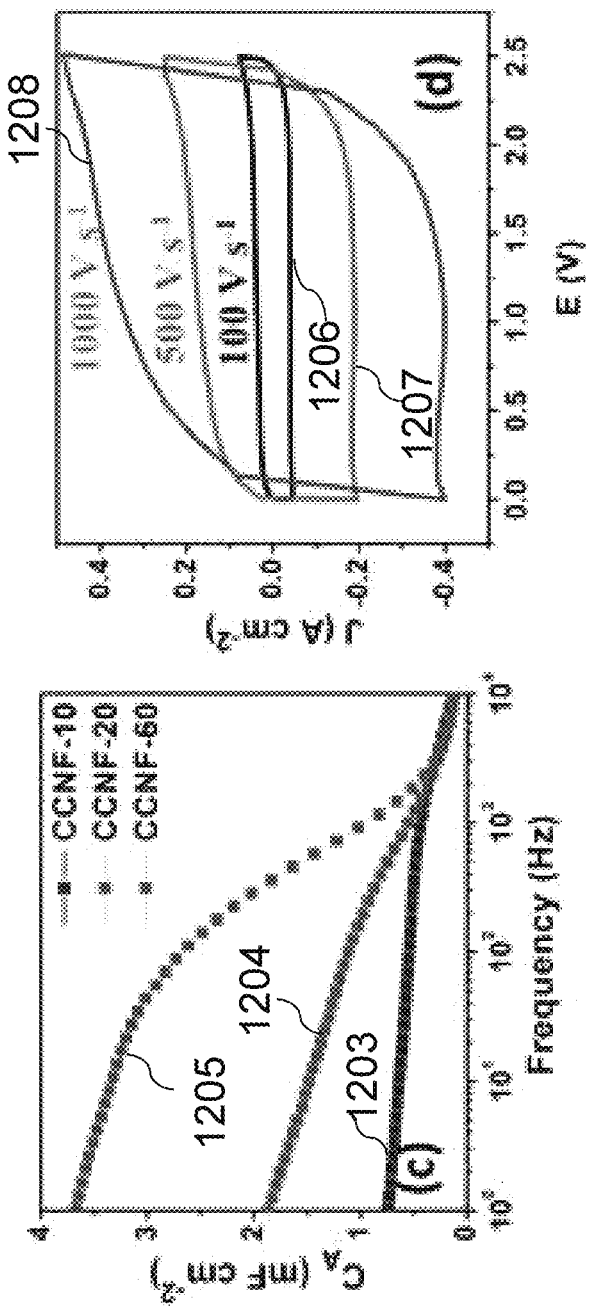
FIG. 12C is a graph showing areal capacitance vs. frequency for the three CNN electrodes in the organic electrolyte.
FIG. 12D is a graph of cyclic voltammetry (CV) of one CNN electrode (thickness 10 μm) based organic cell up to a rate of 1000 V $s^{-1}$ in a potential window 0-2.5 V.

The areal capacitance vs. frequency for three electrodes are compared in FIG. 12C (plots 1203-1205 are for thickness of 10, 20 and 60 μm, respectively), with a 120 Hz capacitance of 0.51, 1.08 and 2.55 mF cm$^{-2}$ for CBC-10, CBC-20 and CBC-60 electrodes, respectively, and the corresponding volumetric capacitances of 0.51, 0.54 and 0.425 F cm$^{-3}$. The −45° characteristic frequency occurs at 1.8, 0.55 and 0.11 kHz, for CBC-10, CBC-20 and CBC-60, respectively, and the phase angles at 120 Hz are −80°, −63° and −44°. The ionic conductivity of electrolyte solution plays a significant role in determining electrolyte dependent frequency response behavior. The ionic conductivity of 6 M KOH solution at room temperature is as high as 620 mS cm$^{-1}$, whereas the conductivity of TEABF$_4$ in acetonitrile solution is merely less than a hundred mS cm$^{-1}$. The relative bulkiness of the ions in organic solution slows the motion of the ions in the electrolyte and especially within the electrode matrix. As a result, organic cells exhibit slower response than their aqueous counterparts.

Figures 12E, 12F:
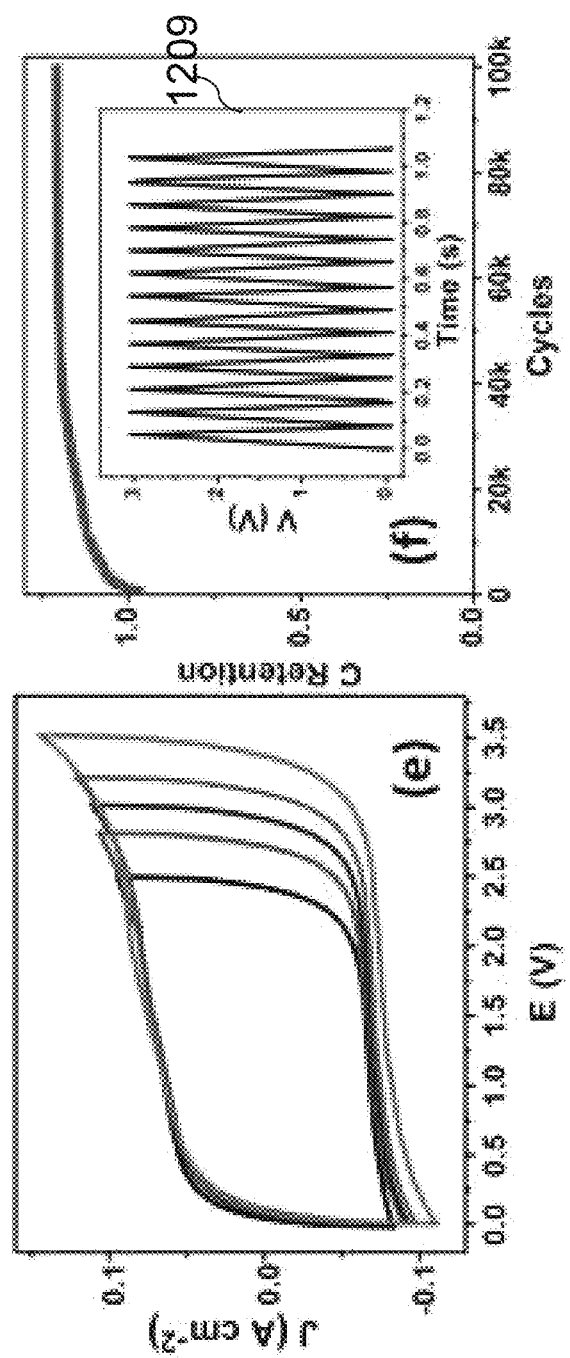
FIG. 12F is a graph of the cell stability test up to 100K cycles with the inset 1209 as a section of C-D curve.

In comparison to aqueous cells, organic cells can work at much higher voltage. CV study of a CBC-10 based organic cell was performed up to 1000 V s$^{-1}$ rates in a potential window of 0-2.5 V (FIG. 12D). The CV profiles 1206-1208 (for 100, 500, and 1000 V s$^{-1}$, respectively, maintained the desired quasi-rectangular shape even at such high rates. In fact, in TEABF$_4$/AN organic electrolyte, the electrode may even works at a potential window up to 3.5 V (FIG. 12E). This is a prominent characteristic of the organic electrolyte cells of the present invention for high voltage AC-supercap development. As demonstrated in FIG. 12F, an organic cell was tested in 3 V window continuously for 100,000 full charge-discharge cycles. It is interesting to notice that except for initial cycles, the cell capacitance gradually increased during cycling, and it stabilized after about 50,000 cycles, with more than 20% increase of the capacitance. An increase in capacitance is expected due to complete surface area utilization. Surface wetting of nanostructured electrode depends on viscosity and surface tension of the electrolyte. Organic electrolyte has high viscosity and lower surface tension, so it typically takes longer for organic electrolyte to wet the whole active surface area, resulting the observed capacitance increase.

It was observed that the organic cells exhibit smaller capacitance than aqueous cells. The relative dielectric constant of the corresponding solvent medium certainly has a role in determining the double layer capacitance, since water has a dielectric constant of 80.1, more than double over that of acetonitrile (37.5).

The difference in ionic radii of solvated ions might also impact the capacitance. The solvated ionic radii of $K^+$ and $OH^-$ are 3.31 Å and 3.00 Å, respectively. In contrast, the solvated ionic radii of $TEA^+$ and $BF_4^-$ in acetonitrile are 13.04 Å and 11.56 Å, respectively. For larger ions, the number of adhered ions per unit surface area will be smaller. Surface wettability (or the accessible surface area) is perhaps the most critical factor. For PECVD grown VOG electrodes, a pure carbon surface renders their hydrophobic property, and therefore a lower capacitance in aqueous electrolyte than in organic electrolyte. However, carbonized cellulose always have oxygen remains and XPS study of our CBC materials indicated ~5% oxygen remaining, which renders the CBC of the present invention with high water absorption capability to form CBC hydrogel. These three factors result in a larger CBC electrode capacitance in aqueous electrolyte than in organic electrolyte.

Plasma Pyrolysis Vs. Thermal Pyrolysis

It is noted that several studies have employed pyrolyzed bacterial cellulose as electrodes for conventional EC, where typical furnace based pyrolysis and chemical activation technique was adopted. In those reports, high-density micropores and mesopores were introduced for enhanced energy density. The large electrochemical resistance arising from strong porous effect results in their sluggish frequency response, and therefore, they cannot be applied for AC-supercaps. In embodiments of the present invention, when the same BC aerogel was pyrolyzed using the conventional furnace process at 800° C. for 2 hours in Ar environment, even without chemical activation, the resulting CNF film electrodes exhibited sluggish response with $f_0$ of 8 Hz in KOH and 3 Hz in $TEABF_4/AN$ organic electrolyte. The CBC electrodes from the long-duration thermal pyrolysis process have a very slow frequency response and are not suitable for AC-supercaps.

Plasma gases also play a crucial role in determining the CBC property and its frequency response. Pure $H_2$ plasma and $CH_4/H_2$ (1:2) mixture plasma was both used for BC pyrolysis, and the obtained CBC had considerable different morphology and frequency response. Even with the same input plasma power, the sample in pure $H_2$ plasma had a considerable lower temperature than that in $CH_4/H_2$ mixture plasma and the etching effect by the pure $H_2$ plasma might also contribute to micropore generation in CBC. Therefore, CBC pyrolyzed in $H_2$ plasma had a characteristic frequency $f_0 \sim 100$ Hz, more than one order of magnitude lower than in $CH_4/H_2$ mixture plasma.

It should be emphasized that the nanoscale fibers of BC with a large surface area is an important factor for achieving large capacitance density. Microscale plant cellulose, i.e., conventional Kimwipe tissue paper, was compared with nanoscale BC. For a same thickness, the former had a capacitance ~5 times smaller than the latter when both were prepared under the same plasma pyrolysis condition. All these results indicated the superiority of plasma pyrolysis of nanoscale BC crosslinked fibers for use in AC-supercaps.

Applications

In contrast to conventional supercaps that only run at quasi-DC current by acting as energy storage, AC-supercaps can respond at high frequency, and therefore act as filtering capacitors. They have much larger capacitance density and smaller equivalent series resistance (ESR) than AECs. Thus, they offer much better performance for power circuits.

Most of AEC functions could be replaced by the compact and much better AC-supercaps of the present invention. For compact, low-profile and other space-demanding applications, the low capacitance density and hence bulky size of AECs is the acute pain point, while AC-supercap can perfectly solve the problem. For space undemanding but power or temperature demanding heavy-duty operations, the relative large thermal generation due to large ESR and high failure rate with limited lifetime of AECs are often complained by customers, but lack of alternative technologies to fulfill their needs. Surge, peak or pulse current caused polarity reverse also shortens the AEC lifetime. AC-supercaps with its low ESR, low loss and potentially high-temperature rating, can also solve these pains of AECs. This is significant in that, with billions of pieces sold per year, AECs are ubiquitous in consumer, medical, and defense devices, telecomm, industry, renewable energy and power transmission infrastructures, and many other legacy electric systems for filtering, bypass, decoupling, and burst power functions. This represents a multi-billion sub-segment of the global capacitor industry. Furthermore, compact size or slim/flexible format and efficiency of AC-supercaps will also find applications for wearable or implantable devices, used for spike filtering, pulse energy storage, and pulse generation.

Such replacement of AC-supercaps for AECs includes but not limited to:

Miniature Design (e.g., thinner flat panel)
Smoother Filtering (e.g., solid-state lighting)
Higher Efficiency (less power consumption)
Longer lifetime As verify to the potential capabilities (for EOG electrodes and CNN electrodes), the CBC-10 based organic AC-supercaps were used for pulse energy storage and ripple current filtering.

Figure 13A:
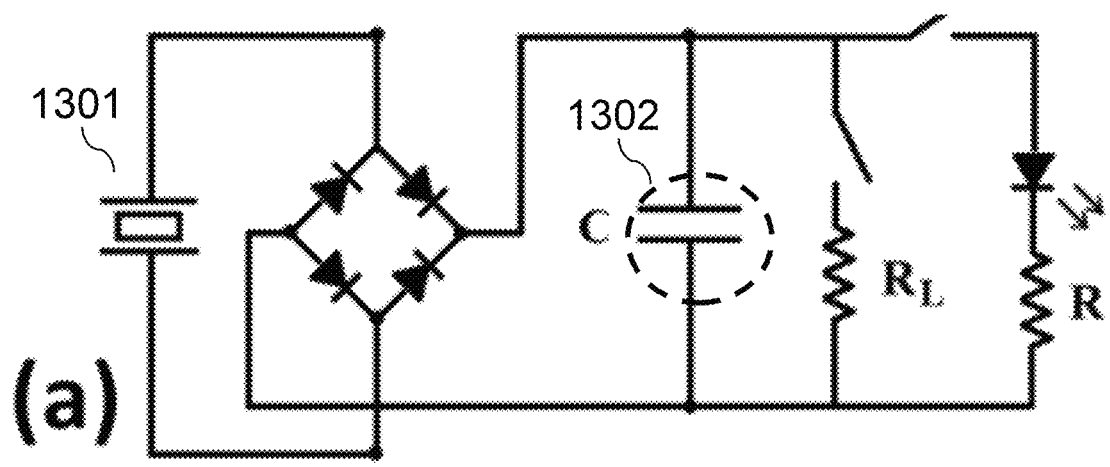
FIGS. 13A-13B are, respectively, a schematic and photo of a circuit used for pulse energy harvesting and storage to demonstrate of capability of AC-supercaps for environmental pulse energy harvesting. The inset photo 1309 in FIG. 13B is showing that the charged AC-supercap can turn on a green LED (the LED running time depends on the stored energy).
Figure 13B:
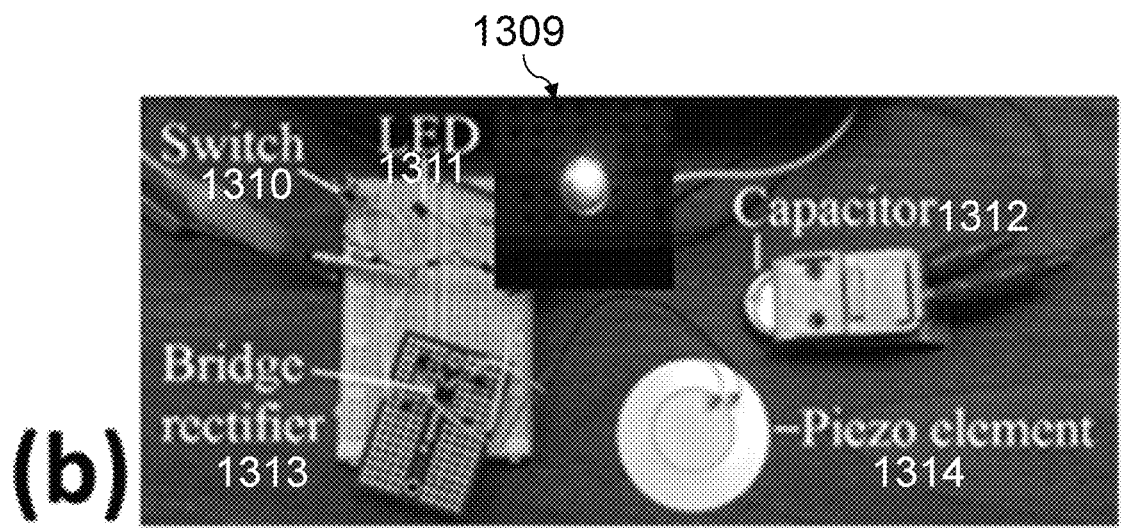

For environmental pulse energy harvest testing, a piezoelectric element (CEB-44D06 from CUI Inc., Tualatin, Oregon) was used to generate a pulsed voltage signal from external mechanical noises. The vibration of a motor or hand finger tapping was used to simulate the environmental pulse energy. The testing circuit is shown in FIGS. 13A-13B. The schematic of FIG. 13A includes the piezoelectric element 1302 that picks up environmental noise and the AC-supercap 1302. The photo of FIG. 13B includes a switch 1310, an LED 1311, an AC-supercap r 1312, a bridge rectifier 1313, and a piezo element 1314. The inset photo 1309 in FIG. 13B is showing that the charged AC-supercap can turn on a green LED (the LED running time depends on the stored energy).

The generated pulse from the piezoelectric element was passed through the bridge rectifier and fed across the AC-supercap. A suitable Zener diode might also be used to clamp the voltage if it is over the 3V rating of the AC-supercap. A 3 MΩ resistor was used to simulate a micro-power sensor load.

Figure 13C:
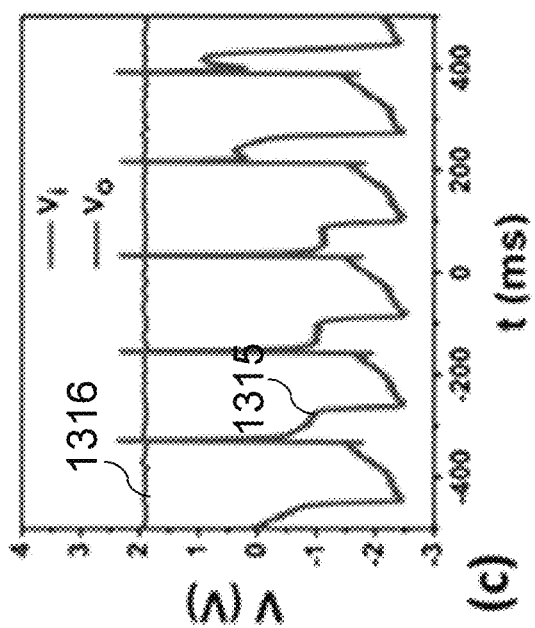
FIG. 13C is a graph of the generated electric pulses from finger tapping of the piezoelectric element shown in the circuit of FIGS. 13A-13B, and the pulse energy that was stored into the AC-supercap shown in FIGS. 13A-13B. The irregular pulse voltage generated by the piezoelectric element under hand finger tapping ($V_i$) and the voltage across the AC-supercap ($V_o$) when powering a mega ohm resistive load.

For demonstration purpose, a green light-emitting diode (LED) was also used as a high-power pulse load. In FIG. 13C, the generated electric pulses ($V_i$) (plot 1315) from finger tapping of the piezoelectric element is shown, and the pulse energy was stored into the AC-supercap with a DC output ($V_o$) close to 2V (plot 1316), which provides a constant current to the mega ohm low-power load. It can even turn on a green LED (inset photo 1309) for a short period. In a different experiment to simulate applications of environmental energy harvesting, the generated irregular pulses ($V_i$) from a piezoelectric element, which was attached to a motor as the vibration source, were stored into an AC-supercap after rectification, and the stored energy (or DC voltage $V_o$) was supplied to power a micro-power element.

Figure 14A:
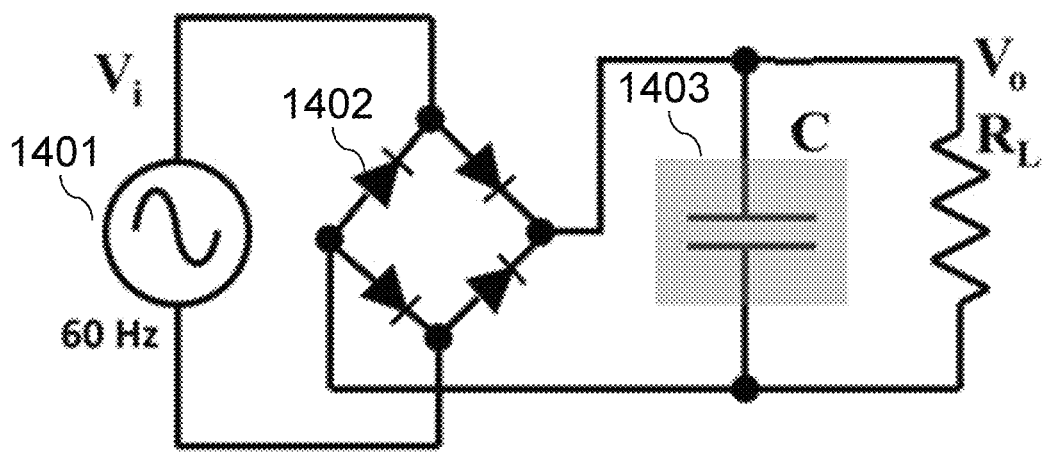
FIG. 14A is a schematic of a circuit used to demonstrate capability of AC-supercap for ripple current filtering.
Figure 14B:
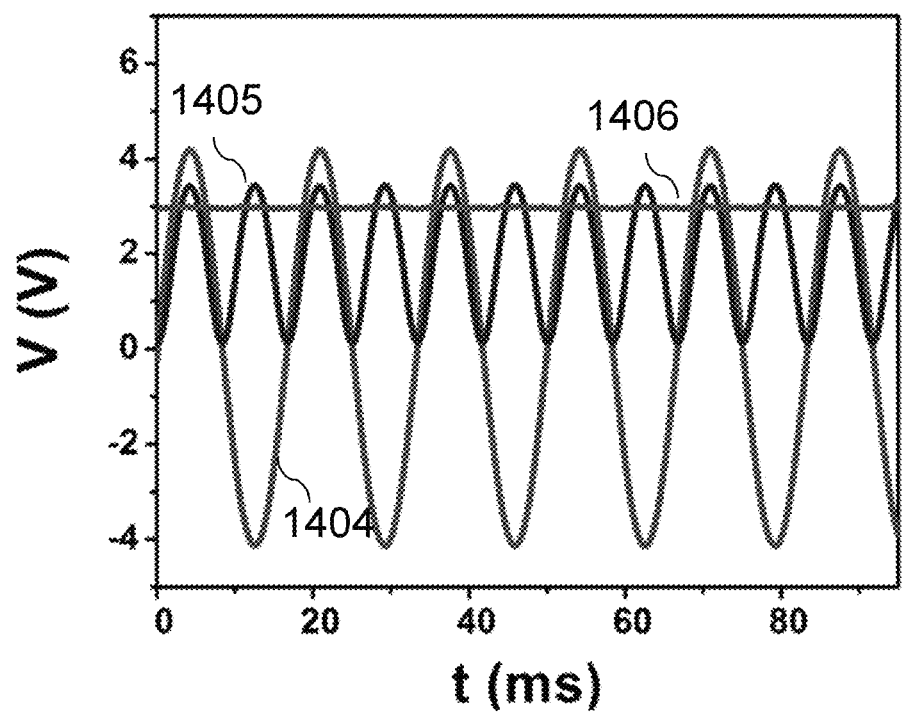
FIG. 14B is a graph showing the input voltage wave applied into the circuit of FIG. 14A, and the rectified pulse wave when the AC-supercap was not connected in the circuit of FIG. 14A, and the output DC voltage after AC-supercap filtering in the circuit of FIG. 14A. A resistive load was applied for the two outputs.

60 Hz line-frequency low-voltage AC/DC converter was also demonstrated using the circuit shown in FIG. 14A, having voltage input 1401, full-wave rectifier 1402 and AC-supercap 1403. The AC input signal was first passed full-wave rectifier 1401 and then filtered by AC-supercap 1403 before feeding to a load. 60 Hz sine wave with an amplitude of 4.2 V from a signal generator (which is shown in plot 1404) was applied to simulate the AC voltage in this demonstration. The output after passing the full-wave rectifier when an AC-supercap was not connected (plot 1405), and the output with the AC-supercap (plot 1406) are also shown in FIG. 13D. 3V DC voltage was obtained after the ripple voltage was smoothed by the AC-supercap. These demonstrations confirm the promise of our CBC based AC-supercaps for ripple current filtering and pulse energy storage.

Several embodiments of the invention have been shown and described in details. Some other embodiments are:

For the EOG electrode material, one embodiment described for cellulose paper 101 is Kimwipes® wiper sheets. Other cellulose paper or sheet can be similarly used.

For the EOG electrode material, one embodiment described that EOG is deposited on the carbonized cellulose sheet using microwave plasma CVD. Other plasma deposition method can also be used.

For the AC-supercaps assembled using EOG electrode material, one embodiment described KOH based aqueous electrolyte is used. Many other aqueous electrolytes and many other organic electrolytes can also be used.

For the AC-supercaps, one embodiment described 1 M tetraethylammonium tetrafluoroborate (TEABF4) in anhydrous acetonitrile (AN) solution is used as organic electrolyte. Many other salts in many other anhydrous organic solvents with different concentrations can also be used as the organic electrolyte.

For the carbon nanofiber network (or nanoweb) (CNN) electrode, one embodiment described bacterial nanofiber cellulose aerogel is used for plasm pyrolysis to obtain the CNN electrode material. Other cellulose nanofiber networks or aerogels, such as those cellulose nanofibers extracted from plants or other biomass can also be used for plasma pyrolysis. Furthermore, in addition to cellulose polymer nanofiber, other synthesized polymer nanofibers such as polyacrylonitrile (PAN), polyimide (PI), and phenolic resin nanofibers can also be used for plasma pyrolysis to obtain carbon nanofiber network as electrode. The polymer nanofibers can be derived from their solution by different methods, such as through electrospun.

For AC-supercap cell assembling, one embodiment was described that two symmetric electrodes, separated by a separator that is soaked with aqueous or organic electrolyte, are assembled into a coin cell package. As known in the area of AECs, conventional supercapacitors and batteries, electrodes can also be wound up to pack into cylindrical format. They can be stacked up to pack into prism format, or many other package shapes.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above.

The disclosures of all patents, patent applications, and publications cited herein are hereby incorporated herein by reference in their entirety, to the extent that they provide exemplary, procedural, or other details supplementary to those set forth herein.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

What is claimed is:

1. An AC-supercapacitor comprising:
    (a) a pair of carbon nanofiber network (CNN) electrodes, wherein each of the CNN electrodes in the pair of CNN electrodes comprises a CNN material comprising carbonized cellulose;
    (b) a separator to separate the electrodes; and
    (c) electrolytes between the electrodes, wherein the AC-supercapacitor is operable for running at frequencies of at least 0.1 kHz.

2. The AC-supercapacitor of claim 1, wherein the AC-supercapacitor is operable for running at frequencies of at least 1 kHz.

3. The AC-supercapacitor of claim 1, wherein the AC-supercapacitor uses aqueous electrolyte.

4. The AC-supercapacitor of claim 1, wherein the AC-supercapacitor uses organic electrolyte.

5. The AC-supercapacitor of claim 1, wherein the AC-supercapacitor has a voltage operation window of at least about 2 V.

6. The AC-supercapacitor of claim 1, wherein the carbonized cellulose comprises carbonized cellulose paper.

7. The AC-supercapacitor of claim 1, wherein the carbonized cellulose comprises carbonized bacterial cellulose.

8. The AC-supercapacitor of claim 1, wherein the carbonized cellulose comprises carbonized cellulose aerogel.

9. The AC-supercapacitor of claim 1, wherein the carbonized cellulose comprises carbonized bacterial cellulose aerogel.

10. The AC-supercapacitor of claim 1, wherein the CNN material comprises edge-oriented graphene coated carbonized cellulose.

11. The AC-supercapacitor of claim 10, wherein the edge-oriented graphene coated carbonized cellulose comprises edge-oriented graphene coated carbonized cellulose paper.

12. The AC-supercapacitor of claim 10, wherein the edge-oriented graphene coated carbonized cellulose comprises edge-oriented graphene coated carbonized bacterial cellulose.

13. The AC-supercapacitor of claim 10, wherein the edge-oriented graphene coated carbonized cellulose comprises edge-oriented graphene coated carbonized cellulose aerogel.

14. The AC-supercapacitor of claim 10, wherein the edge-oriented graphene coated carbonized cellulose comprises edge-oriented graphene coated carbonized bacterial cellulose aerogel.

15. The AC-supercapacitor of claim 1, wherein the CNN material has a pore diameter of at least 3.8 nm, and the CNN material is predominately meso- and macro-pores.

* * * * *